US009897902B2

(12) United States Patent
Terashima

(10) Patent No.: US 9,897,902 B2
(45) Date of Patent: Feb. 20, 2018

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventor: Tetsuo Terashima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/408,049

(22) Filed: Jan. 17, 2017

(65) Prior Publication Data
US 2017/0227840 A1 Aug. 10, 2017

(30) Foreign Application Priority Data

Feb. 4, 2016 (JP) ................. 2016-020192

(51) Int. Cl.
*G03B 21/20* (2006.01)
*H05B 41/36* (2006.01)
*H05B 41/24* (2006.01)
*G03B 21/00* (2006.01)

(52) U.S. Cl.
CPC ....... *G03B 21/2053* (2013.01); *G03B 21/006* (2013.01); *G03B 21/2026* (2013.01); *H05B 41/24* (2013.01); *H05B 41/36* (2013.01)

(58) Field of Classification Search
CPC ........ H05B 41/00; H05B 41/02; H05B 41/24; H05B 41/36; G03B 21/2026; G03B 21/2006; G03B 21/2053
See application file for complete search history.

(56) References Cited

U.S. PATENT DOCUMENTS

| 8,008,869 B2 * | 8/2011 | Soma ................. H05B 41/2928 315/209 R |
| 8,044,613 B2 * | 10/2011 | Okawa ............... H05B 41/2928 315/209 R |
| 8,138,684 B2 * | 3/2012 | Tanaka ............... H05B 41/2886 315/291 |

(Continued)

FOREIGN PATENT DOCUMENTS

| JP | 2004-525496 A | 8/2004 |
| JP | 2011-023154 A | 2/2011 |

(Continued)

*Primary Examiner* — William C Dowling
(74) *Attorney, Agent, or Firm* — Oliff PLC

(57) ABSTRACT

A discharge lamp driving device includes a discharge lamp driving section configured to supply a driving current to a discharge lamp including a first electrode and a second electrode and a control section configured to control the discharge lamp driving section. The control section is configured to repeat a unit period. The unit period includes a direct current period including a first direct current period in which a direct current having a first polarity is supplied to the discharge lamp and a second direct current period in which a direct current having a second polarity is supplied to the discharge lamp, and an alternating current period provided between the first direct current period and the second direct current period, an alternating current being supplied to the discharge lamp in the alternating current period. The control section is configured to temporally change length of the direct current period.

20 Claims, 10 Drawing Sheets

(56) References Cited

U.S. PATENT DOCUMENTS

| | | |
|---|---|---|
| 8,269,424 B2 | 9/2012 | Terashima |
| 8,378,581 B2 | 2/2013 | Terashima |
| 8,400,068 B2 | 3/2013 | Terashima |
| 8,853,961 B2 * | 10/2014 | Terashima ......... H05B 41/2928 315/246 |
| 8,922,630 B2 * | 12/2014 | Sato .................... H04N 9/3197 348/55 |
| 9,338,416 B2 * | 5/2016 | Suzuki ................. G03B 21/005 |
| 9,398,275 B2 * | 7/2016 | Suzuki ................. G03B 21/005 |
| 2003/0001518 A1 | 1/2003 | Riederer |
| 2011/0012524 A1 * | 1/2011 | Terashima ......... H05B 41/2883 315/246 |
| 2011/0012525 A1 | 1/2011 | Terashima |
| 2011/0018456 A1 | 1/2011 | Terashima |
| 2012/0043904 A1 | 2/2012 | Terashima |
| 2016/0249440 A1 | 8/2016 | Terashima et al. |

FOREIGN PATENT DOCUMENTS

| | | |
|---|---|---|
| JP | 2011-023288 A | 2/2011 |
| JP | 2011-028943 A | 2/2011 |
| JP | 2012-043678 A | 3/2012 |
| JP | 2012-109159 A | 6/2012 |
| JP | 2013-098147 A | 5/2013 |
| JP | 2016-157562 A | 9/2016 |
| JP | 2016-157664 A | 9/2016 |
| WO | 02/091806 A1 | 11/2002 |

* cited by examiner

DISCHARGE LAMP DRIVING DEVICE, PROJECTOR, AND DISCHARGE LAMP DRIVING METHOD

BACKGROUND

1. Technical Field

The present invention relates to a discharge lamp driving device, a light source device, a projector, and a discharge lamp driving method.

2. Related Art

There is known a method of modulating pulse width of an AC ramp current and modulating a pulse width ratio between pulse width of a positive pulse and pulse width of a negative pulse (e.g., JP-T-2004-525496 (Patent Literature 1)).

When a lamp is deteriorated and a lamp voltage decreases, electrodes are less easily melted. Therefore, protrusions at electrode distal ends decrease in thickness and deterioration of a discharge lamp is accelerated. As measures against such a problem, for example, in the method described above, it is conceivable to increase the pulse width ratio to increase a melting amount of the electrodes.

However, in that case, whereas the melting amount of the protrusion at the distal end of the electrode functioning as an anode is improved, since the temperature of the electrode functioning as a cathode drops, the shape of the distal end of the electrode functioning as the cathode is easily deformed. Therefore, the life of the discharge lamp sometimes cannot be sufficiently improved.

SUMMARY

An advantage of some aspects of the invention is to provide a discharge lamp driving device that can improve the life of a discharge lamp, a light source device including the discharge lamp driving device, and a projector including the light source device. Another advantage of some aspects of the invention is to provide a discharge lamp driving method that can improve the life of a discharge lamp.

An aspect of the invention is directed to a discharge lamp driving device including: a discharge lamp driving section configured to supply a driving current to a discharge lamp including a first electrode and a second electrode; and a control section configured to control the discharge lamp driving section. The control section is configured to repeat a unit period. The unit period includes: a direct current period including a first direct current period in which a direct current having a first polarity, in which the first electrode functions as an anode, is supplied to the discharge lamp and a second direct current period in which a direct current having a second polarity, in which the second electrode functions as the anode, is supplied to the discharge lamp; and an alternating current period provided between the first direct current period and the second direct current period, an alternating current being supplied to the discharge lamp in the alternating current period. The control section is configured to temporally change length of the direct current period.

With the discharge lamp driving device according to the aspect of the invention, the length of the direct current period temporally changes in the repeatedly provided unit period. Therefore, in the unit period in which the length of the direct current period is relatively large, it is possible to increase a heat load applied to the first electrode in the direct current period. It is possible to increase a melting amount of protrusions. On the other hand, in the unit period in which the length of the direct current period is relatively small, it is possible to reduce the heat load applied to the first electrode in the direct current period. It is possible to stabilize an electric discharge position (an arc position). Consequently, in the unit period in which the length of the direct current period is relatively small, it is possible to facilitate formation of the protrusions.

With the discharge lamp driving device according to the aspect of the invention, in the repeatedly provided unit period, the first direct current period and the second direct current period having the opposite polarities are provided. Therefore, it is possible to grow both of a protrusion of the first electrode and a protrusion of the second electrode to be thick. It is possible to stably maintain both of the shapes of the protrusions. Therefore, it is possible to improve the life of the discharge lamp.

The control section may be configured to change the length of the direct current period to temporally repeat an increase and a decrease in the length of the direct current period.

With this configuration, it is possible to more stably maintain the protrusions.

The alternating current period may include a plurality of periods in which each frequency of an alternating current supplied to the discharge lamp is different from one another.

With this configuration, it is easier to grow the protrusions.

The discharge lamp driving device may further include a voltage detecting section configured to detect an inter-electrode voltage of the discharge lamp. The control section may be configured to change the length of the direct current period on the basis of the inter-electrode voltage.

With this configuration, even when the discharge lamp is deteriorated, it is possible to suitably melt the electrodes.

When the inter-electrode voltage is smaller than a first voltage, the control section may be configured to increase the length of the direct current period according to an increase of the inter-electrode voltage, and when the inter-electrode voltage is equal to or larger than the first voltage, the control section may be configured to reduce the length of the direct current period according to the increase of the inter-electrode voltage.

With this configuration, it is possible to appropriately change, according to deterioration of the discharge lamp, a heat load applied to the electrodes. It is possible to further improve the life of the discharge lamp.

The discharge lamp driving device may further include a voltage detecting section configured to detect an inter-electrode voltage of the discharge lamp. The control section may be configured to provide a section in which the unit period is repeated. The section includes a section in which the direct current period in the unit period has first length and a section in which the direct current period in the unit period has second length larger than the first length. When the inter-electrode voltage is smaller than a second voltage, the control section may be configured to increase a number of the unit periods included in the section in which the direct current period has the second length, according to an increase of the inter-electrode voltage, and when the inter-electrode voltage is equal to or larger than the second voltage, the control section may be configured to reduce the number of the unit periods included in the section in which the direct current period has the second length, according to the increase of the inter-electrode voltage.

With this configuration, it is possible to appropriately change, according to deterioration of the discharge lamp, a heat load applied to the electrodes. It is possible to further improve the life of the discharge lamp.

When the inter-electrode voltage is smaller than a third voltage, the control section may be configured to reduce a number of the unit periods included in the section in which the direct current period has the first length, according to an increase of the inter-electrode voltage, and when the inter-electrode voltage is equal to or larger than the third voltage, the control section may be configured to increase the number of the unit periods included in the section in which the direct current period has the first length, according to the increase of the inter-electrode voltage.

With this configuration, it is possible to appropriately change, a stimulus due to a heat load applied to the electrodes. It is possible to further improve the life of the discharge lamp.

The discharge lamp driving device may further include a voltage detecting section configured to detect an inter-electrode voltage of the discharge lamp. The control section may be configured to increase a frequency of an alternating current supplied to the discharge lamp in the alternating current period, according to an increase of the inter-electrode voltage.

With this configuration, it is easy to grow the protrusions to be long. It is possible to further suppress deterioration of the discharge lamp.

The control section may be configured to reduce a frequency of an alternating current supplied to the discharge lamp in the alternating current period, as length of the direct current period is larger.

With this configuration, it is easy to more suitably grow the protrusions.

The unit period may include: a first biased period including a plurality of the first direct current periods and a first opposite polarity period provided between the first direct current periods, the direct current having the second polarity being supplied to the discharge lamp in the first opposite polarity period; and a second biased period including a plurality of the second direct current periods and a second opposite polarity period provided between the second direct current periods, the direct current having the first polarity being supplied to the discharge lamp in the second opposite polarity period. Length of the first opposite polarity period may be smaller than length of the first direct current period and smaller than 0.5 ms. Length of the second opposite polarity period may be smaller than length of the second direct current period and smaller than 0.5 ms.

With this configuration, it is possible to increase a total of lengths of the first direct current periods in the unit period and suppress the temperature of the second electrode from excessively dropping while increasing a heat load applied to the first electrode.

The discharge lamp driving device may further include a voltage detecting section configured to detect an inter-electrode voltage of the discharge lamp. When the inter-electrode voltage is smaller than a fourth voltage, the control section may be configured to increase a number of the first direct current periods included in the unit period, according to an increase of the inter-electrode voltage, and when the inter-electrode voltage is equal to or larger than the fourth voltage, the control section may be configured to reduce the number of the first direct current periods included in the unit period, according to the increase of the inter-electrode voltage.

With this configuration, it is possible to appropriately change, according to deterioration of the discharge lamp, a heat load applied to the electrodes. It is possible to further improve the life of the discharge lamp.

Another aspect of the invention is directed to a light source device including: a discharge lamp configured to emit light; and the discharge lamp driving device.

With the light source device according to the aspect of the invention, since the light source device includes the discharge lamp driving device, it is possible to improve the life of the discharge lamp.

Still another aspect of the invention is directed to a projector including: the light source device; a light modulating device configured to modulate light emitted from the light source device according to an image signal; and a projection optical system configured to project the light modulated by the light modulating device.

With the projector according to the aspect of the invention, since the projector includes the light source device, it is possible to improve the life of the discharge lamp.

Yet another aspect of the invention is directed to a discharge lamp driving method for supplying a driving current to a discharge lamp including a first electrode and a second electrode and driving the discharge lamp. The discharge lamp driving method includes: supplying the driving current to the discharge lamp to repeat a unit period including a direct current period including a first direct current period in which a direct current having a first polarity, in which the first electrode functions as an anode, is supplied to the discharge lamp and a second direct current period in which a direct current having a second polarity, in which the second electrode functions as the anode, is supplied to the discharge lamp and an alternating current period provided between the first direct current period and the second direct current period, an alternating current being supplied to the discharge lamp in the alternating current period; and temporally changing length of the direct current period.

With the discharge lamp driving method according to the aspect of the invention, in the same manner as explained above, it is possible to improve the life of the discharge lamp.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
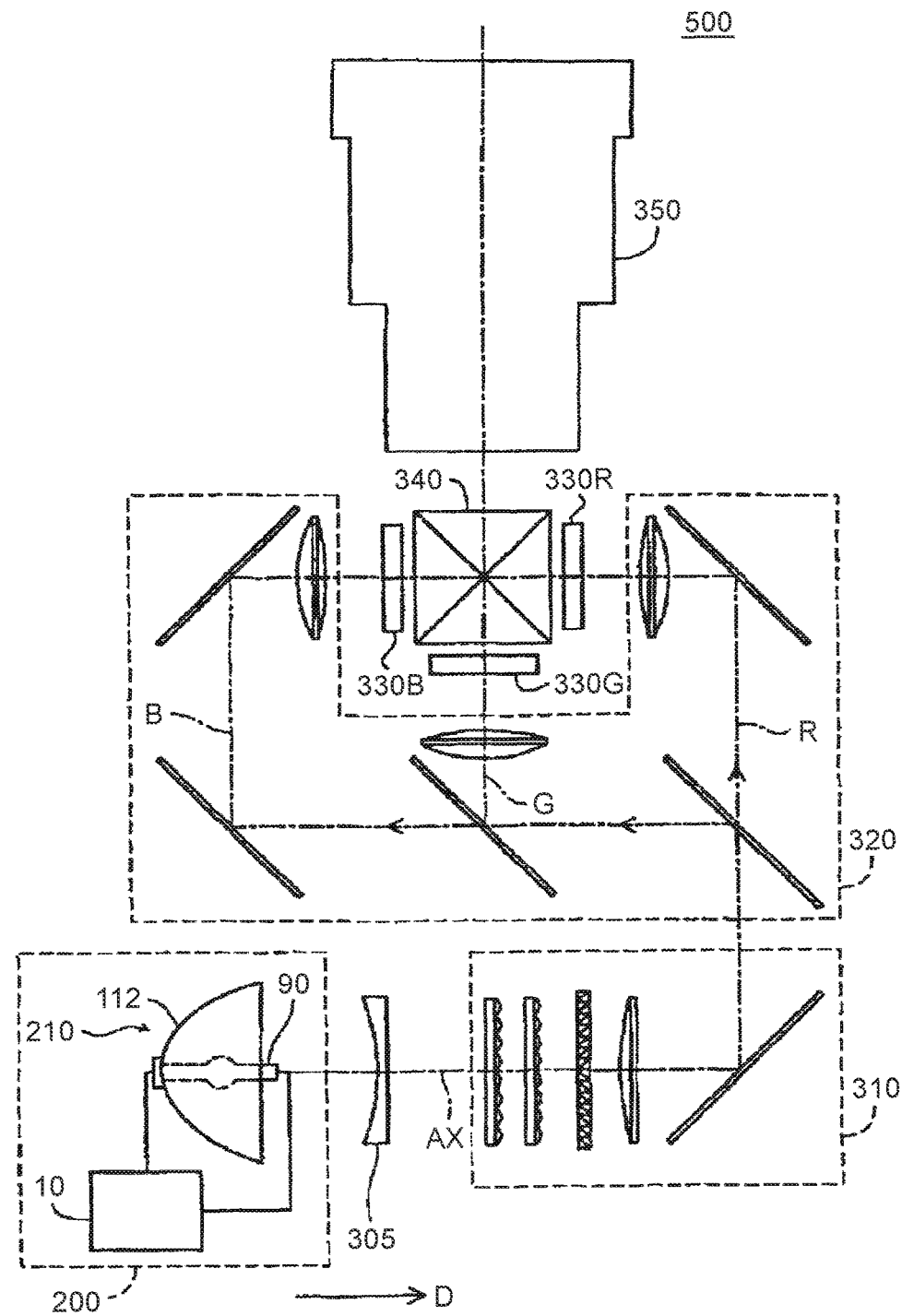
FIG. 1 is a schematic configuration diagram of a projector in a first embodiment.

Projectors according to embodiments of the invention are explained below with reference to the drawings.

Note that the scope of the invention is not limited to embodiments explained below and can be optionally changed within the scope of the technical idea of the invention. In the drawings referred to below, in order to clearly show components, scales, numbers, and the like in structures are sometimes differentiated from those in actual structures.

First Embodiment

As shown in FIG. 1, a projector 500 in a first embodiment includes a light source device 200, a collimating lens 305, an illumination optical system 310, a color separation optical system 320, three liquid crystal light valves (light modulating devices) 330R, 330G, and 330B, a cross dichroic prism 340, and a projection optical system 350.

Light emitted from the light source device 200 passes through the collimating lens 305 and is made incident on the illumination optical system 310. The collimating lens 305 collimates the light from the light source device 200.

The illumination optical system 310 adjusts the illuminance of the light emitted from the light source device 200 to be equalized on the liquid crystal light valves 330R, 330G, and 330B. Further, the illumination optical system 310 aligns polarization directions of the light emitted from the light source device 200 in one direction. This is for the purpose of effectively using the light emitted from the light source device 200 in the liquid crystal light valves 330R, 330G, and 330B.

The light with the illuminance distribution and the polarization directions adjusted is made incident on the color separation optical system 320. The color separation optical system 320 separates the incident light into three color lights, that is, red light (R), green light (G), and blue light (B). The three color lights are respectively modulated according to video signals by the liquid crystal light valves 330R, 330G, and 330B associated with the color lights. The liquid crystal light valves 330R, 330G, and 330B include liquid crystal panels 560R, 560G, and 560B explained below and polarizing plates (not shown in the figure). The polarizing plates are disposed on a light incident side and a light emission side of each of the liquid crystal panels 560R, 560G, and 560B.

The modulated three color lights are combined by the cross dichroic prism 340. Combined light is made incident on the projection optical system 350. The projection optical system 350 projects the incident light on a screen 700 (see FIG. 3). Consequently, a video is displayed on the screen 700. Note that well-known configurations can be adopted as the respective configurations of the collimating lens 305, the illumination optical system 310, the color separation optical system 320, the cross dichroic prism 340, and the projection optical system 350.

Figure 2:
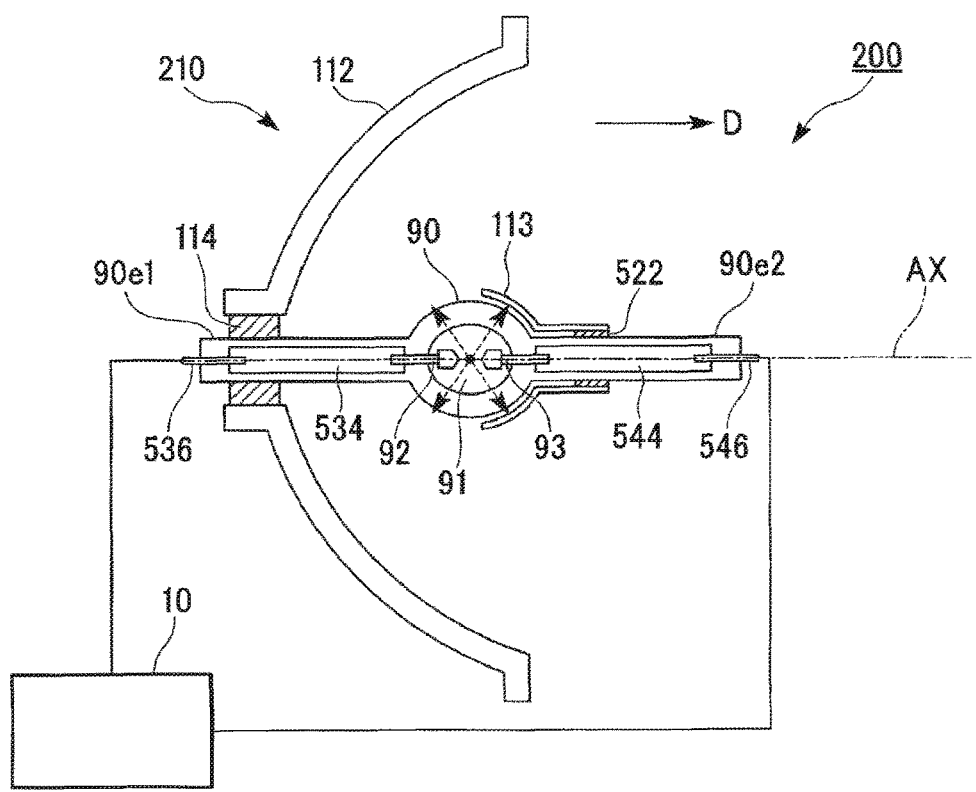
FIG. 2 is a diagram showing a discharge lamp in the first embodiment.

FIG. 2 is a sectional view showing the configuration of the light source device 200. The light source device 200 includes a light source unit 210 and a discharge lamp lighting device (a discharge lamp driving device) 10. In FIG. 2, a sectional view of the light source unit 210 is shown. The light source unit 210 includes a main reflection mirror 112, a discharge lamp 90, and a sub reflection mirror 113.

The discharge lamp lighting device 10 supplies a driving current I to the discharge lamp 90 and lights the discharge lamp 90. The main reflection mirror 112 reflects light discharged from the discharge lamp 90 toward a radiating direction D. The radiating direction D is parallel to an optical axis AX of the discharge lamp 90.

The shape of the discharge lamp 90 is a bar shape extending along the radiating direction D. One end portion of the discharge lamp 90 is referred to as first end portion 90e1. The other end portion of the discharge lamp 90 is referred to as second end portion 90e2. The material of the discharge lamp 90 is, for example, a translucent material such as quartz glass. The center of the discharge lamp 90 is swelled in a spherical shape. The inside of the discharge lamp 90 is a discharge space 91. In the discharge space 91, gas, which is an electric discharge medium, including rare gas and a metal halogen compound is encapsulated.

The distal ends of a first electrode 92 and a second electrode 93 project into the discharge space 91. The first electrode 92 is disposed on the first end portion 90e1 side of the discharge space 91. The second electrode 93 is disposed on the second end portion 90e2 side of the discharge space 91. The shape of the first electrode 92 and the second electrode 93 are a bar shape extending along the optical axis AX. In the discharge space 91, electrode distal end portions of the first electrode 92 and the second electrode 93 are disposed to be spaced apart by a predetermined distance and opposed to each other. The material of the first electrode 92 and the second electrode 93 is metal such as tungsten.

A first terminal 536 is provided at the first end portion 90e1 of the discharge lamp 90. The first terminal 536 and the first electrode 92 are electrically connected by a conductive member 534 that pierces through the inside of the discharge lamp 90. Similarly, a second terminal 546 is provided at the second end portion 90e2 of the discharge lamp 90. The second terminal 546 and the second electrode 93 are electrically connected by a conductive member 544 that pierces through the inside of the discharge lamp 90. The material of the first terminal 536 and the second terminal 546 is metal such as tungsten. As the material of the conductive members 534 and 544, for example, molybdenum foil is used.

The first terminal 536 and the second terminal 546 are connected to the discharge lamp lighting device 10. The discharge lamp lighting device 10 supplies the driving current I for driving the discharge lamp 90 to the first terminal 536 and the second terminal 546. As a result, arc discharge occurs between the first electrode 92 and the second electrode 93. Light (discharge light) generated by the arc discharge is radiated toward all directions from a discharge position as indicated by broken line arrows.

The main reflection mirror 112 is fixed to the first end portion 90e1 of the discharge lamp 90 by a fixing member 114. The main reflection mirror 112 reflects, toward the radiating direction D, in the discharge light, light traveling toward the opposite side of the radiating direction D. The shape of a reflection surface (a surface on the discharge lamp 90 side) of the main reflection mirror 112 is not particularly limited within a range in which the discharge light can be reflected toward the radiating direction D. For example, the shape may be a spheroidal shape or may be a rotated parabolic shape. For example, when the shape of the reflection surface of the main reflection mirror 112 is the rotated parabolic shape, the main reflection mirror 112 can convert the discharge light into light substantially parallel to the optical axis AX. Consequently, the collimating lens 305 can be omitted.

The sub reflection mirror 113 is fixed to the second end portion 90e2 side of the discharge lamp 90 by a fixing member 522. The shape of a reflection surface (a surface on the discharge lamp 90 side) of the sub reflection mirror 113 is a spherical shape including a portion on the second end portion 90e2 side of the discharge space 91. The sub reflection mirror 113 reflects, toward the main reflection mirror 112, in the discharge light, light traveling toward the opposite side of a side where the main reflection mirror 112 is disposed. Consequently, it is possible to improve efficiency of use of the light radiated from the discharge space 91.

The material of the fixing members 114 and 522 is not particularly limited within a range in which the material is a heat resistant material that can withstand heat generation from the discharge lamp 90. The material is, for example, an inorganic adhesive. A method of fixing the disposition of the main reflection mirror 112 and the sub reflection mirror 113 and the discharge lamp 90 is not limited to a method of fixing the main reflection mirror 112 and the sub reflection mirror 113 to the discharge lamp 90. Any method can be adopted. For example, the discharge lamp 90 and the main reflection mirror 112 may be independently fixed to a housing (not shown in the figure) of the projector 500. The same applies to the sub reflection mirror 113.

A circuit configuration of the projector 500 is explained below.

Figure 3:
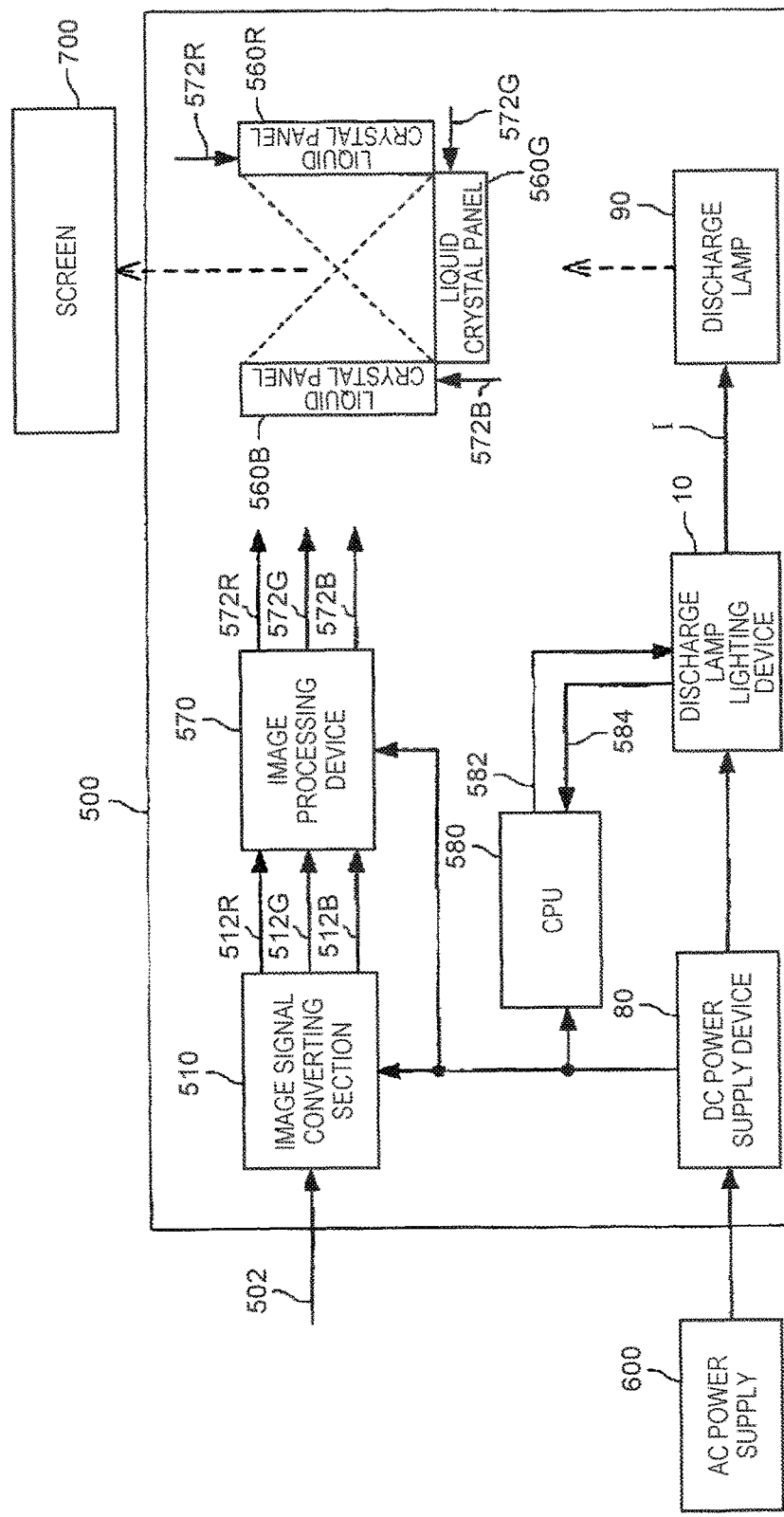
FIG. 3 is a block diagram showing various components of the projector in the first embodiment.

FIG. 3 is a diagram showing the circuit configuration of the projector 500 in this embodiment. The projector 500 includes, besides the optical system shown in FIG. 1, an image signal converting section 510, a DC power supply device 80, liquid crystal panels 560R, 560G, and 560B, an image processing device 570, and a CPU (Central Processing Unit) 580.

The image signal converting section 510 converts an image signal 502 (a luminance-color difference signal, an analog RGB signal, etc.) input from the outside into a digital RGB signal having predetermined word length to generate image signals 512R, 512G, and 512B and supplies the image signals 512R, 512G, and 512B to the image processing device 570.

The image processing apparatus 570 performs image processing respectively on the three image signals 512R, 512G, and 512B. The image processing apparatus 570 supplies driving signals 572R, 572G, and 572B for respectively driving the liquid crystal panels 560R, 560G, and 560B to the liquid crystal panels 560R, 560G, and 560B.

The DC power supply device 80 converts an AC voltage supplied from an external AC power supply 600 into a constant DC voltage. The DC power supply device 80 supplies the DC voltage to the image signal converting section 510 present on a secondary side of a transformer (although not shown in the figure, included in the DC power supply device 80), the image processing device 570, and the discharge lamp lighting device 10 present on a primary side of the transformer.

The discharge lamp lighting device 10 generates a high voltage between the electrodes of the discharge lamp 90 during a start and causes dielectric breakdown to form a discharge path. Thereafter, the discharge lamp lighting device 10 supplies the driving current I for the discharge lamp 90 to maintain electric discharge.

The liquid crystal panels 560R, 560G, and 560B are respectively provided in the liquid crystal light valves 330R, 330G, and 330B explained above. The liquid crystal panels 560R, 560G, and 560B respectively modulate, on the basis of the driving signals 572R, 572G, and 572B, transmittances (luminances) of the color lights made incident on the liquid crystal panels 560R, 560G, and 560B via the optical system explained above.

The CPU 580 controls various operations from a lighting start to extinction of the projector 500. For example, in the example shown in FIG. 3, the CPU 580 outputs a lighting command and an extinguishing command to the discharge lamp lighting device 10 via a communication signal 582. The CPU 580 receives lighting information of the discharge lamp 90 from the discharge lamp lighting device 10 via a communication signal 584.

The configuration of the discharge lamp lighting device 10 is explained below.

Figure 4:
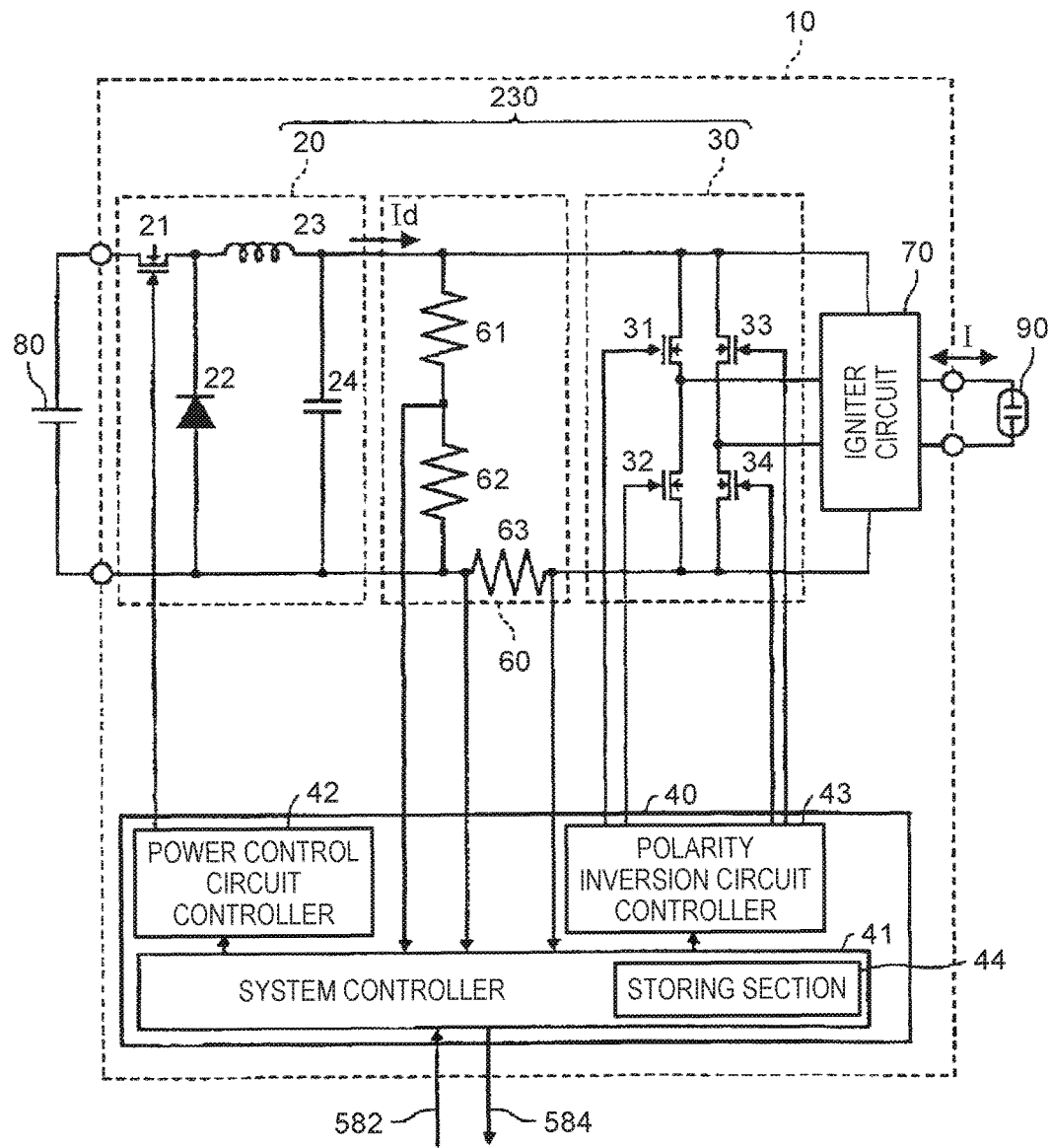
FIG. 4 is a circuit diagram of a discharge lamp lighting device in the first embodiment.

FIG. 4 is a diagram showing an example of a circuit configuration of the discharge lamp lighting device 10.

The discharge lamp lighting device 10 includes, as shown in FIG. 4, a power control circuit 20, a polarity inversion circuit 30, a control section 40, an operation detecting section 60, and an igniter circuit 70.

The power control circuit 20 generates driving power Wd supplied to the discharge lamp 90. In this embodiment, the power control circuit 20 is configured by a down-chopper circuit that receives a voltage from the DC power supply device 80 as an input, steps down the input voltage, and outputs a direct current Id.

The power control circuit 20 includes a switch element 21, a diode 22, a coil 23, and a capacitor 24. The switch element 21 is configured by, for example, a transistor. In this embodiment, one end of the switch element 21 is connected to a positive voltage side of the DC power supply device 80. The other end is connected to a cathode terminal of the diode 22 and one end of the coil 23.

One end of the capacitor 24 is connected to the other end of the coil 23. The other end of the capacitor 24 is connected to an anode terminal of the diode 22 and a negative voltage side of the DC power supply device 80. A current control signal is input to a control terminal of the switch element 21 from the control section 40 explained below and ON/OFF of the switch element 21 is controlled. As the current control signal, for example, a PWM (Pulse Width Modulation) control signal may be used.

When the switch element 21 is turned on, electric current flows to the coil 23 and energy is accumulated in the coil 23. Thereafter, when the switch element 21 is turned off, the energy accumulated in the coil 23 is emitted through a route passing the capacitor 24 and the diode 22. As a result, the direct current Id corresponding to a ratio of ON time of the switch element 21 is generated.

The polarity inversion circuit 30 inverts, at predetermined timing, the polarity of the direct current Id input from the power control circuit 20. Consequently, the polarity inversion circuit 30 generates the driving current I, which is a direct current continuing for a controlled time, or the driving current I, which is an alternating current having any frequency f, and outputs the driving current I. In this embodiment, the polarity inversion circuit 30 is configured by an inverter-bridge circuit (a full-bridge circuit).

The polarity inversion circuit 30 includes a first switch element 31, a second switch element 32, a third switch element 33, and a fourth switch element 34 configured by transistors or the like. The polarity inversion circuit 30 includes a configuration in which the first switch element 31 and the second switch element 32 connected in series and the third switch element 33 and the fourth switch element 34 connected in series are connected in parallel to each other. Polarity inversion control signals are respectively input to control terminals of the first switch element 31, the second switch element 32, the third switch element 33, and the fourth switch element 34 from the control section 40. ON/OFF operation of the first switch element 31, the second switch element 32, the third switch element 33, and the fourth switch element 34 is controlled on the basis of the polarity inversion control signals.

In the polarity inversion circuit 30, operation for alternately turning on and off the first and fourth switch elements 31 and 34 and the second and third switch elements 32 and 33 is repeated. Consequently, the polarity of the direct current Id output from the power control circuit 20 is alternately inverted. The polarity inversion circuit 30 generates the driving current I, which is a direct current that continues the same polarity state for a controlled time, or the driving current I, which is an alternating current having a controlled frequency, and outputs the driving current I from a common connection point of the first switch element 31 and the second switch element 32 and a common connection point of the third switch element 33 and the fourth switch element 34.

That is, the polarity inversion circuit 30 is controlled such that, when the first switch element 31 and the fourth switch element 34 are on, the second switch element 32 and the third switch element 33 are off and, when the first switch element 31 and the fourth switch element 34 are off, the second switch element 32 and the third switch element 33 are on. Therefore, when the first switch element 31 and the fourth switch element 34 are on, the driving current I flowing from one end of the capacitor 24 to the first switch element 31, the discharge lamp 90, and the fourth switch element 34 in this order is generated. When the second switch element 32 and the third switch element 33 are on, the driving current I flowing from one end of the capacitor 24 to the third switch element 33, the discharge lamp 90, and the second switch element 32 in this order is generated.

In this embodiment, a combined portion of the power control circuit 20 and the polarity inversion circuit 30 corresponds to a discharge lamp driving section 230. That is, the discharge lamp driving section 230 supplies the driving current I for driving the discharge lamp 90 to the discharge lamp 90.

The control section 40 controls the discharge lamp driving section 230. In the example shown in FIG. 4, the control section 40 controls the power control circuit 20 and the polarity inversion circuit 30 to thereby control parameters such as a retention time in which the driving current I continues in the same polarity, a current value of the driving current I (a power value of driving power Wd), and a frequency f of the driving current I. The control section 40 performs, on the polarity inversion circuit 30, according to polarity inversion timing for the driving current I, polarity inversion control for controlling the retention time in which the driving current I continues in the same polarity, the frequency f of the driving current I, and the like. The control section 40 performs, on the power control circuit 20, current control for controlling a current value of the direct current Id to be output.

The configuration of the control section 40 is not particularly limited. In this embodiment, the control section 40 includes a system controller 41, a power control circuit controller 42, and a polarity inversion circuit controller 43. Note that a part or the entire control section 40 may be configured by a semiconductor integrated circuit.

The system controller 41 controls the power control circuit controller 42 and the polarity inversion circuit controller 43 to thereby control the power control circuit 20 and the polarity inversion circuit 30. The system controller 41 may control the power control circuit controller 42 and the polarity inversion circuit controller 43 on the basis of a lamp voltage (an inter-electrode voltage) Vla detected by the operation detecting section 60 and the driving current I.

In this embodiment, a storing section 44 is connected to the system controller 41.

The system controller 41 may control the power control circuit 20 and the polarity inversion circuit 30 on the basis of information stored in the storing section 44. In the storing section 44, information concerning driving parameters such as a retention time in which the driving current I continues in the same polarity and a current value, a frequency f, a waveform, and a modulation pattern of the driving current I may be stored.

The power control circuit controller 42 outputs a current control signal to the power control circuit 20 on the basis of a control signal from the system controller 41 to thereby control the power control circuit 20.

The polarity inversion circuit controller 43 outputs a polarity inversion control signal to the polarity inversion circuit 30 on the basis of a control signal from the system controller 41 to thereby control the polarity inversion circuit 30.

The control section 40 is realized using a dedicated circuit to be capable of performing the control explained above and various kinds of control of processing explained below. On the other hand, for example, a CPU executes a control program stored in the storing section 44, whereby the control section 40 functions as a computer to be capable of performing the various kinds of control of the processing.

Figure 5:
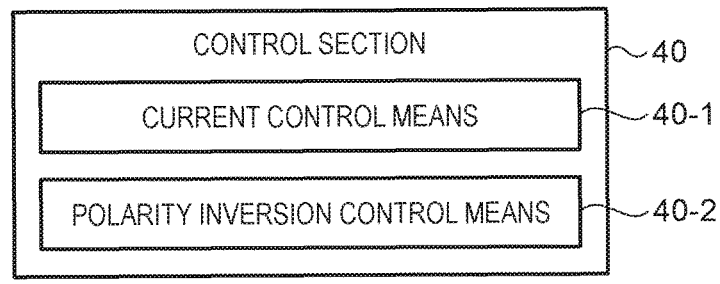
FIG. 5 is a block diagram showing a configuration example of a control section in the first embodiment.

FIG. 5 is a diagram for explaining another configuration example of the control section 40. As shown in FIG. 5, the control section 40 may be configured to function as, according to a control program, a current control unit 40-1 for controlling the power control circuit 20 and a polarity inversion control unit 40-2 for controlling the polarity inversion circuit 30.

In the example shown in FIG. 4, the control section 40 is configured as a part of the discharge lamp lighting device 10. On the other hand, the CPU 580 may be configured to perform a part of the functions of the control section 40.

In this embodiment, the operation detecting section 60 includes a voltage detecting section that detects the lamp voltage Vla of the discharge lamp 90 and outputs lamp voltage information to the control section 40. The operation detecting section 60 may include a current detecting section that detects the driving current I and outputs driving current information to the control section 40. In this embodiment, the operation detecting section 60 includes a first resistor 61, a second resistor 62, and a third resistor 63.

In this embodiment, the voltage detecting section of the operation detecting section 60 detects the lamp voltage Vla according to voltages divided by the first resistor 61 and the second resistor 62 connected in parallel to the discharge lamp 90 and connected in series to each other. In this embodiment, the current detecting section detects the driving current I according to a voltage generated in the third resistor 63 connected in series to the discharge lamp 90.

The igniter circuit 70 operates only during a lighting start of the discharge lamp 90. The igniter circuit 70 supplies, to between the electrodes (between the first electrode 92 and the second electrode 93) of the discharge lamp 90, a high voltage (a voltage higher than a voltage during normal lighting of the discharge lamp 90) necessary to performing dielectric breakdown to form a discharge path between electrodes (between the first electrode 92 and the second electrode 93) of the discharge lamp 90 during a lighting start of the discharge lamp 90. In this embodiment, the igniter circuit 70 is connected in parallel to the discharge lamp 90.

Figure 6A:
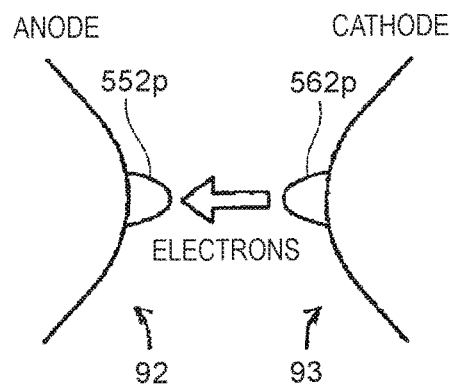
FIG. 6A is a diagram showing a state of protrusions at electrode distal ends of the discharge lamp.
Figure 6B:
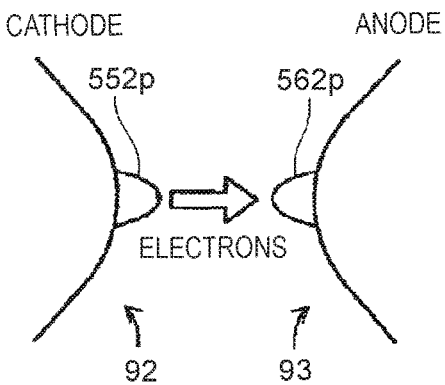
FIG. 6B is a diagram showing a state of the protrusions at the electrode distal ends of the discharge lamp.

In FIGS. 6A and 6B, distal end portions of the first electrode 92 and the second electrode 93 are shown. Protrusions 552p and 562p are respectively formed at the distal ends of the first electrode 92 and the second electrode 93.

Electric discharge that occurs between the first electrode 92 and the second electrode 93 mainly occurs between the protrusion 552p and the protrusion 562p. When the protrusions 552p and 562p are present as in this embodiment, compared with when protrusions are absent, it is possible to suppress movement of electric discharge positions (arc positions) in the first electrode 92 and the second electrode 93.

FIG. 6A shows a first polarity state in which the first electrode 92 operates as an anode and the second electrode 93 operates as a cathode. In the first polarity state, electrons move from the second electrode 93 (the cathode) to the first electrode 92 (the anode) according to electric discharge. The electrons are emitted from the cathode (the second electrode 93). The electrons emitted from the cathode (the second electrode 93) collide with the distal end of the anode (the first electrode 92). Heat is generated by the collision. The temperature at the distal end (the protrusion 552p) of the anode (the first electrode 92) rises.

FIG. 6B shows a second polarity state in which the first electrode 92 operates as a cathode and the second electrode 93 operates as an anode. In the second polarity state, conversely to the first polarity state, electrons move from the first electrode 92 to the second electrode 93. As a result, the temperature at the distal end (the protrusion 562p) of the second electrode 93 rises.

In this way, the driving current I is supplied to the discharge lamp 90, whereby the temperature of the anode, with which the electrons collide, rises. On the other hand, the temperature of the cathode, which emits the electrons, drops while the cathode is emitting the electrons toward the anode.

The inter-electrode distance between the first electrode 92 and the second electrode 93 increases according to deterioration of the protrusions 552p and 562p. This is because the protrusions 552p and 562p wear. When the inter-electrode distance increases, since the resistance between the first electrode 92 and the second electrode 93 increases, the lamp voltage Vla increases. Therefore, it is possible to detect a change in the inter-electrode distance, that is, a deterioration degree of the discharge lamp 90.

Note that, since the first electrode 92 and the second electrode 93 have the same configuration, in the following explanation, only the first electrode 92 is sometimes representatively explained. Since the protrusion 552p at the distal end of the first electrode 92 and the protrusion 562p at the distal end of the second electrode 93 have the same configuration, in the following explanation, only the protrusion 552p is sometimes representatively explained.

Figure 7:
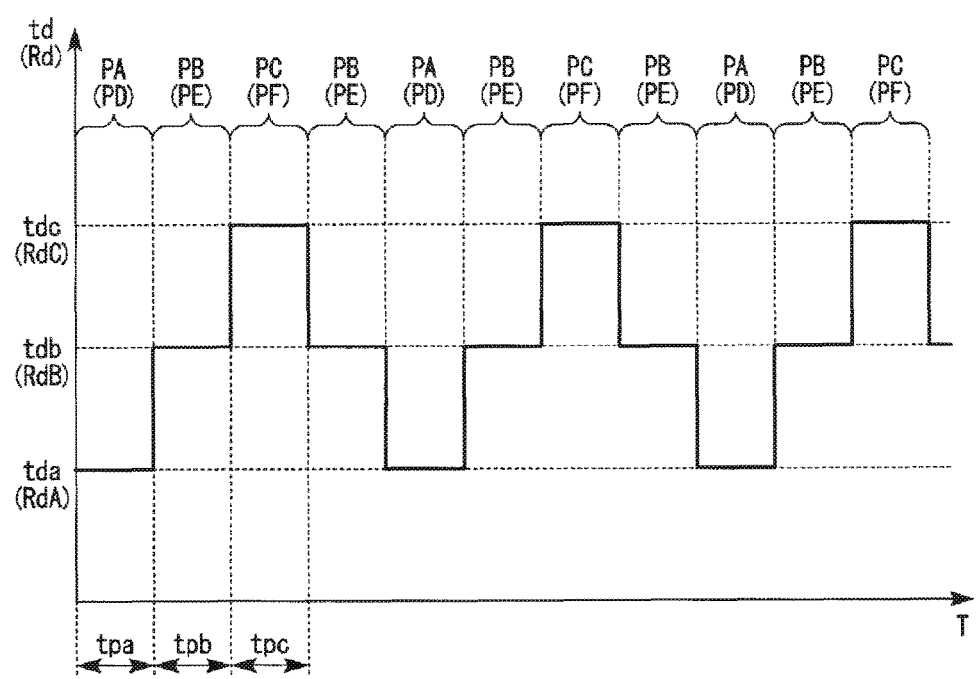
FIG. 7 is a diagram showing a change in a period in which a driving current is supplied to the discharge lamp in the first embodiment.
Figure 8:
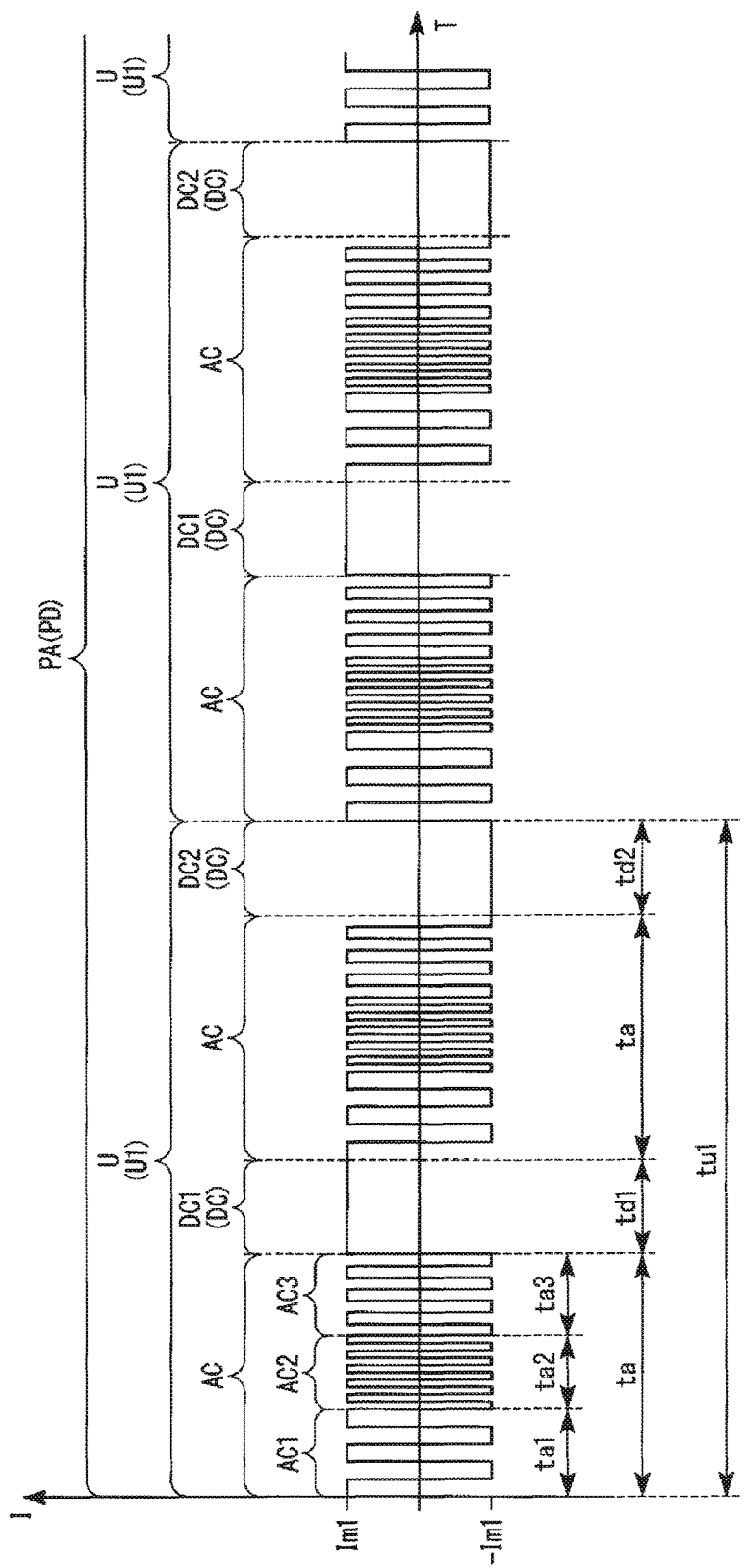
FIG. 8 is a diagram showing an example of the driving current in the first embodiment.

Control of the discharge lamp driving section 230 by the control section 40 is explained. FIG. 7 is a diagram showing a change in a period in which the driving current I is supplied to the discharge lamp 90 in this embodiment. In FIG. 7, the vertical axis indicates length td of a direct current period DC and the horizontal axis indicates time T. FIG. 8 is a diagram showing an example of the driving current I in this embodiment. In FIG. 8, the vertical axis indicates the driving current I and the horizontal axis indicates the time T. The driving current I is shown as positive in the first polarity state and is shown as negative in the second polarity state.

As shown in FIG. 7, in this embodiment, the control section 40 controls the discharge lamp driving section 230 to provide first sections (sections) PA, second sections (sections) PB, and third sections (sections) PC. As shown in FIG. 8, the first section PA is configured by repeating a plurality of unit periods U. That is, the control section 40 controls the discharge lamp driving section 230 to provide the first section PA in which the unit periods U are repeated.

The unit period U includes the direct current period DC and an alternating current period AC. The direct current period DC includes a first direct current period DC1 and a second direct current period DC2. In the example shown in FIG. 8, the unit period U is configured by providing the alternating current period AC, the first direct current period DC1, the alternating current period AC, and the second direct current period DC2 in this order.

The first direct current period DC1 is a period in which a direct current having a first polarity, in which the first electrode 92 functions as an anode, is supplied to the discharge lamp 90. In the example shown in FIG. 8, in the first direct current period DC1, the driving current I having a constant current value Im1 is supplied to the discharge lamp 90.

The second direct current period DC2 is a period in which a direct current having a second polarity, in which the second electrode 93 functions as the anode, is supplied to the discharge lamp 90. In the example shown in FIG. 8, in the second direct current period DC2, the driving current I having a constant current value −Im1 is supplied to the discharge lamp 90. That is, in the second direct current period DC2, a direct current having a polarity opposite to the polarity in the first direct current period DC1 is supplied to the discharge lamp 90. In this embodiment, length td1 of the first direct current period DC1 and length td2 of the second direct current period DC2 are the same. Note that the length td1 of the first direct current period DC1 and the length td2 of the second direct current period DC2 may be different from each other.

The alternating current period AC is a period in which an alternating current is supplied to the discharge lamp 90. In the example shown in FIG. 8, in the alternating current period AC, the driving current I of a rectangular wave, the polarity of which is inverted a plurality of times between the current value Im1 and the current value −Im1, is supplied to the discharge lamp 90. The alternating current period AC is provided between the first direct current period DC1 and the second direct current period DC2. In the example shown in FIG. 8, two alternating current periods AC are provided for each of the unit period U. Length ta of the alternating current period AC is, for example, larger than the length td1 of the first direct current period DC1. Note that the length ta of the alternating current period AC may be, for example, smaller than or the same as the length td1 of the first direct current period DC1.

In this embodiment, the alternating current period AC includes a first alternating current period AC1, a second alternating current period AC2, and a third alternating current period AC3. In the first alternating current period AC1, the second alternating current period AC2, and the third alternating current period AC3, frequencies f of the driving current I supplied to the discharge lamp 90 are different from one another. That is, in this embodiment, the alternating current period AC includes a plurality of periods in which the frequencies f of an alternating current supplied to the discharge lamp 90 are different.

In the example shown in FIG. 8, the frequency f of the alternating current supplied to the discharge lamp 90 increases in the order of the first alternating current period AC1, the third alternating current period AC3, and the second alternating current period AC2. Length ta1 of the first alternating current period AC1, length ta2 of the second alternating current period AC2, and length ta3 of the third alternating current period AC3 may be the same or may be different from each other.

Although not shown in the figure, like the first section PA, the second section PB and the third section PC are configured by repeating pluralities of the unit periods U. The numbers of the unit periods U included in the sections are, for example, the same. The second section PB and the third section PC are different from the first section PA in the length td of the direct current period DC. That is, in this embodiment, a section includes a plurality of sections in which the lengths td of the direct current periods DC in the unit periods U are different from one another. The length td of the direct current period DC is length obtained by adding up the length td1 of the first direct current period DC1 and the length td2 of the second direct current period DC2. In this embodiment, for example, as shown in FIGS. 7 and 8, the length td of the direct current period DC, which is length obtained by adding up the length td1 of the first direct current period DC1 and the length td2 of the second direct current period DC2 in the unit period U of the first section PA, is tda.

As shown in FIG. 7, the sections are continuously provided along a predetermined pattern. Since the sections are configured by repeating the pluralities of unit periods U, by continuously providing the sections, the pluralities of unit periods U, in which the lengths td of the direct current periods DC are different, are continuously provided. That is, the control section 40 controls the discharge lamp driving section 230 to repeat the unit period U and temporally changes the length of the direct current period DC.

The length td of the direct current period DC in the first section PA is tda. The length td of the direct current period DC in the second section PB is tdb. The length td of the direct current period DC in the third section PC is tdc. The lengths tda, tdb, and tdc increase in this order. That is, the length td of the direct current period DC increases in the order of the first section PA, the second section PB, and the third section PC.

In this embodiment, the length td1 of the first direct current period DC1 and the length td2 of the second direct current period DC2 are the same. Therefore, the length td1 of the first direct current period DC1 and the length td2 of the second direct current period DC2 also increase in the order of the first section PA, the second section PB, and the third section PC.

The lengths td of the direct current periods DC included the unit periods U of the sections are, for example, the same in one section. That is, in the unit periods U included in the first section PA, the lengths td of the direct current periods DC are the same in all the unit periods U and is tda. In the unit periods U included in the second section PB, the lengths td of the direct current periods DC are the same in all the unit periods U and is tdb. In the unit periods U included in the third section PC, the lengths td of the direct current periods DC are the same in all the unit periods U and is tdc.

The length ta of the alternating current period AC in the second section PB and the length ta of the alternating current period AC in the third section PC are, for example, the same as the length ta of the alternating current period AC in the first section PA. The same applies to each of the first alternating current period AC1 to the third alternating current period AC3.

Since the lengths ta of the alternating current periods AC are the same and the lengths td of the direct current periods DC are different, the lengths of the sections are different from one another. That is, length tpa of the first section PA, length tpb of the second section PB, and length tpc of the third section PC are, for example, different from one another and increase in this order. In the sections, direct current ratios Rd are different. The direct current ratio Rd is a ratio of the length td of the direct current period DC to length tu1 of the unit period U.

The vertical axis of FIG. 7 indicates the direct current ratio Rd as well. As shown in FIG. 7, a value of the direct current ratio Rd in the unit period U of the first section PA is RdA. A value of the direct current ratio Rd in the unit period U of the second section PB is RdB. A value of the direct current ratio Rd in the unit period U of the third section PC is RdC. RdA, RdB, and RdC increase in this order. That is, the direct current ratio Rd increases in the order of the first section PA, the second section PB, and the third section PC.

Otherwise, the second section PB and the third section PC are the same as the first section PA.

The first section PA, the second section PB, and the third section PC are provided such that the length td of the direct current period DC temporally increases and decreases. That is, in the example shown in FIG. 7, a pattern is cyclically repeated in which the sections are provided such that the length td of the direct current period DC increases in the order of the first section PA, the second section PB, and the third section PC and, thereafter, the sections are provided such that the length td of the direct current period DC decreases in the order of the third section PC, the second section PB, and the first section PA. That is, the control section 40 changes the length td of the direct current period DC to temporally repeat an increase and a decrease. In this embodiment, the first section PA, the second section PB, and the third section PC are provided such that the direct current ratio Rd temporally increases and decrease.

The control by the control section 40 can also be represented as a discharge lamp driving method. That is, the discharge lamp driving method according to an aspect of this embodiment is a discharge lamp driving method for supplying the driving current I to the discharge lamp 90 including the first electrode 92 and the second electrode 93 and driving the discharge lamp 90. The discharge lamp driving method includes: supplying the driving current I to the discharge lamp 90 to repeat the unit period U including the direct current period DC including the first direct current period DC1 in which a direct current having a first polarity, in which the first electrode 92 functions as an anode, is supplied to the discharge lamp 90 and the second direct current period DC2 in which a direct current having a second polarity, in which the second electrode 93 functions as the anode, is supplied to the discharge lamp 90 and the alternating current period AC provided between the first direct current period DC1 and the second direct current period DC1, an alternating current being supplied to the discharge lamp 90 in the alternating current period AC; and temporally changing the length td of the direct current period DC.

According to this embodiment, in the repeatedly provided unit period U, the length td of the direct current period DC temporally changes. Therefore, in the unit period U in which the length td of the direct current period DC is relatively large, it is possible to increase a heat load applied to the first electrode 92 in the direct current period DC. It is possible to increase a melting amount of the protrusion 552p. On the other hand, in the unit period U in which the length td of the direct current period DC is relatively small, it is possible to reduce the heat load applied to the first electrode 92 in the direct current period DC. It is possible to stabilize an electric discharge position (an arc position). Consequently, in the unit period U in which the length td of the direct current period DC is relatively small, it is possible to facilitate formation of the protrusion 552p.

Specifically, in the unit period U of the third section PC, since the length td of the direct current period DC is relatively large, it is possible to increase the melting amount of the protrusion 552p. In the unit period U of the first section PA, since the length td of the direct current period DC is relatively small, it is possible to facilitate the formation of the protrusion 552p. In this way, by causing the heat load applied to the first electrode 92 to temporally fluctuate, it is possible to suitably perform the melting and the formation of the protrusion 552p. It is possible to grow the protrusion 552p to be thick. Consequently, it is possible to stably maintain the shape of the protrusion 552p.

When the first electrode functioning as the anode is heated, the temperature of the second electrode functioning as the cathode drops. Therefore, when the first electrode is unevenly heated, the temperature of the second electrode drops. Even if the second electrode is heated thereafter, the protrusion sometimes cannot be suitably grown. In this case, since the second electrode is deformed, the electric discharge position (the arc position) becomes unstable. A flicker sometimes occurs. The second electrode easily becomes thin and small. When a relatively large heat load is applied, the second electrode disappears. Scattering tungsten sometimes adheres to the inner wall of the discharge lamp to cause blackening. Light emitted from the discharge lamp scatters. Light eclipsed by the optical system of the projector sometimes increases to reduce the illuminance of the projector. Consequently, the life of the discharge lamp sometimes decreases.

On the other hand, according to this embodiment, in the repeatedly provided unit period U, the first direct current period DC1 and the second direct current period DC2, in which the polarities are different from each other, are provided. Therefore, it is possible to grow both of the protrusion 552p of the first electrode 92 and the protrusion 562p of the second electrode 93 to be thick. It is possible to stably maintain both of the shapes of the protrusions 552p and 562p. Consequently, it is possible to suppress the occurrence of the flicker and the blackening and the illuminance decrease of the projector 500. As a result, according to this embodiment, it is possible to improve the life of the discharge lamp 90.

According to this embodiment, the length td of the direct current period DC temporally increases and decreases. Therefore, it is possible to alternately perform the melting and the formation of the protrusion 552p. It is possible to grow the protrusion 552p to be thick. It is easy to stably maintain the shape of the protrusion 552p. Consequently, it is possible to further improve the life of the discharge lamp 90.

In the example shown in FIG. 7, the first section PA in which the heat load applied to the first electrode 92 is relatively small and the third section PC in which the heat load applied to the first electrode 92 is relatively large are alternately provided across the second section PB. Therefore, the length td of the direct current period DC temporally changes. The heat load applied to the first electrode 92 in the second section PB is larger than the heat load applied to the first electrode 92 in the first section PA and is smaller than the heat load applied to the first electrode 92 in the third section PC. Therefore, while the section changes between the first section PA and the third section PC, it is possible to gradually change the melting amount of the protrusion 552p. It is possible to form the protrusion 552p to be smooth. Consequently, it is possible to make the boundary between a main body of the first electrode 92 and the protrusion 552p smooth. It is possible to form the robust protrusion 552p firmly rooted in the main body of the first electrode 92. Therefore, it is possible to further improve the life of the discharge lamp 90.

According to this embodiment, the alternating current period AC includes the plurality of periods in which the frequencies f are different. Therefore, in the alternating current period AC, it is possible to change the heat load applied to the first electrode 92. Consequently, it is possible to increase a stimulus due to the heat load applied to the first electrode 92 in the alternating current period AC. It is possible to further grow the protrusion 552p.

Note that the invention is not limited to the embodiments. Other configurations explained below may be adopted. In the following explanation, explanation of components same as the components explained above is sometimes omitted by, for example, denoting the components with the same reference numerals and signs as appropriate.

In the above explanation, the length td of the direct current period DC is fixed in all the unit periods U in one section. However, not only this, but the length td of the direct current period DC may be different for each of the unit periods U or in a part of the unit periods U in one section.

Figure 9:
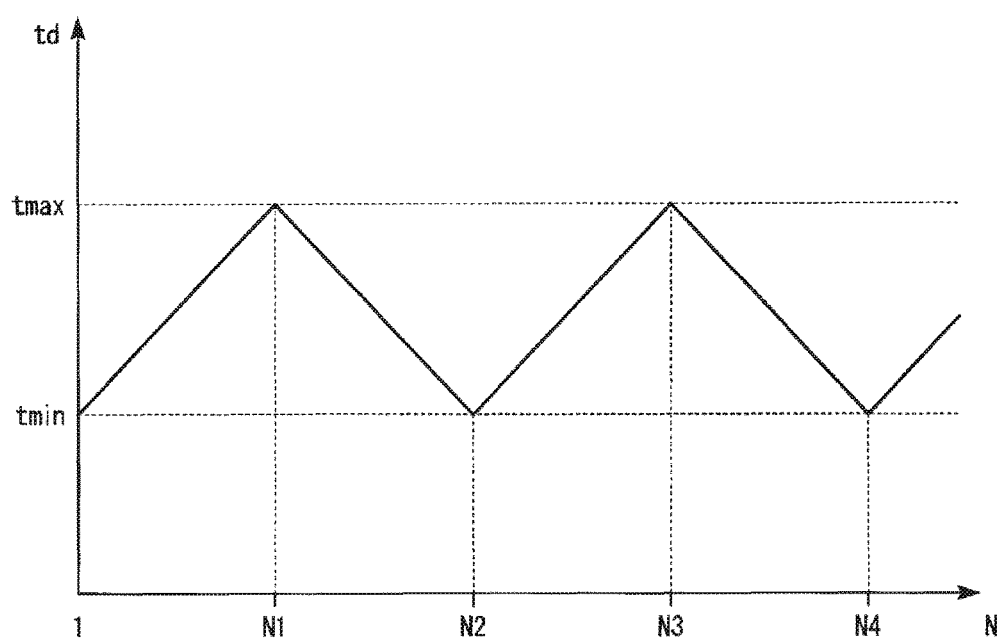
FIG. 9 is a graph showing an example of a relation between the number of provided unit periods and the length of a direct current period in the first embodiment.

It is also possible to repeat the plurality of unit periods U without providing the first section PA, the second section PB, and the third section PC. In this case, the length td of the direct current period DC may be changed every time the unit period U is provided. FIG. 9 is a graph showing an example of a relation between a number N of the provided unit periods U and the length td of the direct current period DC. In FIG. 9, the vertical axis indicates the length td of the direct current period DC and the horizontal axis indicates the number N of the provided unit periods U.

As shown in FIG. 9, for example, in the unit period U provided first (N=1), when the length td of the direct current period DC is a minimum tmin, the length td of the direct current period DC increases every time the unit period U is provided until N1 unit periods U are provided. In an N1-th unit period U, the length td of the direct current period DC is a maximum tmax. Thereafter, the length td of the direct current period DC decreases every time the unit period U is provided until N2 (N2>N1) unit periods U are provided. In an N2-th unit period U, the length td of the direct current period DC is a minimum tmin. The length td of the direct current period DC increases again from the N2-th unit period U to an N3 (N3>N2)-th unit period U. The length td of the direct current period DC decreases again from the N3-th unit period U to an N4 (N4>N3)-th unit period U. Thereafter, the length td of the direct current period DC increases and decreases along the same pattern.

In this way, since the length td of the direct current period DC changes every time the unit period U is provided, it is possible to gradually change the melting amount of the protrusion 552p. Therefore, it is possible to form the shape of the protrusion 552p smoother. It is possible to form the robust protrusion 552p. Consequently, it is possible to further improve the life of the discharge lamp 90.

In the example shown in FIG. 9, the length td of the direct current period DC linearly changes with respect to the number N of the provided unit periods U in each of the ranges in which the length td increases and decreases. However, not only this, but the length td of the direct current period DC may nonlinearly change with respect to the number N of the provided unit periods U in each of the ranges in which the length td increases and decreases.

The control section 40 may change parameters of the sections on the basis of the lamp voltage Vla. For example, the control section 40 may change the length td of the direct current period DC on the basis of the lamp voltage Vla. Therefore, it is possible to change, according to the deterioration of the discharge lamp 90, the heat load applied to the first electrode 92. Consequently, it is possible to suitably maintain the shape of the protrusion 552p.

Specifically, in this configuration, for example, when the lamp voltage Vla is smaller than a first voltage Vla1, the control section 40 increases the length td of the direct current period DC according to an increase in the lamp voltage Vla. When the lamp voltage Vla is equal to or larger than the first voltage Vla1, the control section 40 reduces the length td of the direct current period DC according to the increase in the lamp voltage Vla.

When the deterioration of the discharge lamp 90 progresses to some degree, the protrusion 552p of the first electrode 92 is less easily melted. Therefore, it is desirable to increase the heat load applied to the first electrode 92 according to the deterioration of the discharge lamp 90.

When the deterioration of the discharge lamp 90 further progresses, the protrusion 552p easily becomes thin. Therefore, when the heat load applied to the first electrode 92 is large, there is fear that the protrusion 552p disappears. Therefore, after the deterioration of the discharge lamp 90 progresses to the certain degree, it is desirable to reduce the heat load applied to the first electrode 92.

On the other hand, with the configuration explained above, in a range in which the lamp voltage Vla is smaller than the first voltage Vla1, the length td of the direct current period DC increases according to the increase in the lamp voltage Vla. Therefore, it is possible to increase, according to the deterioration of the discharge lamp 90, the heat load applied to the first electrode 92 in the unit period U. Consequently, even when the discharge lamp 90 is deteriorated, it is possible to suitably melt the first electrode 92.

On the other hand, with the configuration explained above, in a range in which the lamp voltage Vla is larger than the first voltage Vla1, the length td of the direct current period DC decreases according to the increase in the lamp voltage Vla. Therefore, when the deterioration of the discharge lamp 90 relatively greatly progresses, it is possible to reduce the heat load applied to the first electrode 92. It is possible to suppress the protrusion 552p from disappearing. As a result, even when the deterioration of the discharge lamp 90 relatively greatly progresses, it is easy to stably maintain the shape of the protrusion 552p.

In Table 1, an example of a change in the length td1 of the first direct current period DC1 due to the change in the lamp voltage Vla is shown. In Table 1, only the length td1 of the first direct current period DC1 is shown. However, for example, the length td2 of the second direct current period DC2 has a value same as the length td1 of the first direct current period DC1.

TABLE 1

| Lamp voltage Vla [V] | Length td1 of the first direct current period DC1 [ms] | | |
|---|---|---|---|
| | First section PA | Second section PB | Third section PC |
| 55 or more, less than 60 | 5 | 10.0 | 15 |
| 60 or more, less than 65 | 5 | 10.5 | 16 |
| 65 or more, less than 70 | 5 | 11.0 | 17 |
| 70 or more, less than 75 | 5 | 11.5 | 18 |
| 75 or more, less than 80 | 5 | 12.0 | 19 |
| 80 or more, less than 85 | 5 | 12.5 | 20 |
| 85 or more, less than 90 | 5 | 12.0 | 19 |
| 90 or more, less than 95 | 5 | 11.5 | 18 |
| 95 or more, less than 100 | 5 | 11.0 | 17 |
| 100 or more, less than 130 | 5 | 10.5 | 16 |

In Table 1, the first voltage Vla1 is 85 V. In the second section PB and the third section PC, in a range in which the lamp voltage Vla is less than 85 V, the length td1 of the first direct current period DC1 increases stepwise according to the increase in the lamp voltage Vla. In a range in which the lamp voltage Vla is 85 V or more, the length td1 of the first direct current period DC1 decreases stepwise according to the increase in the lamp voltage Vla.

Change width between a minimum and a maximum of the length td1 of the first direct current period DC1 in the third section PC is larger than change width of the length td1 of the first direct current period DC1 in the second section PB. In this way, by setting the change width of the length td of the direct current period DC large in the third section PC in which the heat load applied to the first electrode 92 is relatively large, when the discharge lamp 90 is deteriorated, it is easy to further increase the heat load applied to the first electrode 92. Therefore, it is possible to further melt the protrusion 552p. When the deterioration of the discharge lamp 90 relatively greatly progresses, it is possible to suitably reduce the heat load applied to the first electrode 92. It is possible to further suppress the disappearance of the protrusion 552p.

In the example shown in Table 1, the length td1 of the first direct current period DC1 in the first section PA is fixed irrespective of the change in the lamp voltage Vla. Therefore, it is possible to more greatly change, according to the change in the lamp voltage Vla, a difference in the heat load applied to the first electrode 92 when the section changes between the first section PA and the third section PC. That is, while the lamp voltage Vla is deteriorated to a certain degree, it is possible to further increase the difference in the heat load applied to the first electrode 92 and further increase a stimulus applied to the first electrode 92. Consequently, when the discharge lamp 90 is deteriorated, it is possible to further melt the protrusion 552p.

In Table 1, the length td1 of the first direct current period DC1 in the second section PB changes at change width smaller than the change width of the length td1 of the first direct current period DC1 in the third section PC. Consequently, even when a difference between the length td1 of the first direct current period DC1 in the first section PA and the length td1 of the first direct current period DC1 in the third section PC changes according to the change in the lamp voltage Vla, it is easy to set a melting amount of the protrusion 552p in the second section PB in the middle between a melting amount of the protrusion 552p in the first section PA and a melting amount of the protrusion 552p in the third section PC. Therefore, it is possible to gradually change the melting amount of the protrusion 552p. Consequently, even when the lamp voltage Vla changes, it is possible to form the robust protrusion 552p firmly rooted in the main body of the first electrode 92. It is possible to further improve the life of the discharge lamp 90.

The control section 40 may change the numbers of the unit periods U included in the sections on the basis of the lamp voltage Vla. In this configuration, for example, when the lamp voltage Vla is smaller than a second voltage Vla2, the control section 40 increases, according to the increase in the lamp voltage Vla, the number of the unit periods U included in a section (the third section PC) in which the length td of the direct current period DC is relatively large. When the lamp voltage Vla is equal to or larger than the second voltage Vla2, the control section 40 reduces, according to the increase in the lamp voltage Vla, the number of the unit periods U included in the section (the third section PC) in which the length td of the direct current period DC is relatively large.

With this configuration, it is possible to increase, according to the deterioration of the discharge lamp 90, a ratio of the direct current periods DC in all the sections including the first section PA, the second section PB, and the third section PC. Consequently, when the discharge lamp 90 is deteriorated, it is possible to improve the melting amount of the protrusion 552p. With this configuration, when the deterioration of the discharge lamp 90 relatively greatly progresses, it is possible to suitably reduce the heat load applied to the first electrode 92. It is possible to suppress the disappearance of the protrusion 552p.

When the lamp voltage Vla is smaller than a third voltage Vla3, the control section 40 reduces, according to the increase in the lamp voltage Vla, the number of the unit periods U included in a section (the first section PA) in which the length td of the direct current period DC is relatively small. When the lamp voltage Vla is equal to or larger than the third voltage Vla3, the control section 40 increases, according to the increase in the lamp voltage Vla, the number of the unit periods U included in the section (the first section PA) in which the length td of the direct current period DC is relatively small.

With this configuration, it is possible to increase, according to the deterioration of the discharge lamp 90, change width between a minimum and a maximum of the ratio of the direct current periods DC in all the sections including the first section PA, the second section PB, and the third section PC. Therefore, when the discharge lamp 90 is deteriorated to a certain degree, it is possible to increase the stimulus due to the heat load applied to the first electrode 92 and further grow the protrusion 552p. When the deterioration of the discharge lamp 90 relatively greatly progresses, the ratio of the unit periods U in the first section PA in which the heat load is relatively small increases. Therefore, it is possible to suitably reduce the heat load applied to the first electrode 92. It is possible to further suppress the disappearance of the protrusion 552p.

In the configuration explained above, a total of the lengths td of the direct current periods DC in the entire sections is changed by changing the numbers of the unit periods U included in the sections without changing the length td of each of the direct current period DC included in the unit periods U. Therefore, it is possible to change, without changing the configuration of the unit period U, according to the change in the lamp voltage Vla, the heat load applied to the first electrode 92. Consequently, it is possible to facilitate the control of the discharge lamp driving section 230.

Note that, in this specification, "the length of the direct current period temporally changes" means that the lengths td of the direct current periods DC included in the unit periods U temporally change, the total of the lengths td of the direct current periods DC in the sections temporally changes, and the ratio (the direct current ratio Rd) of the direct current period DC in the unit period U temporally changes. When the lengths td of the direct current periods DC included in the unit periods U temporally change, only one of the length td1 of the first direct current period DC1 and the length td2 of the second direct current period DC2 may temporally change.

An example of changes in the numbers of the unit periods U in the sections corresponding to the lamp voltage Vla is shown in Table 2.

TABLE 2

| Lamp voltage Vla [V] | Numbers of the unit periods U included in the sections | | | Average length of the first direct current period DC1 [ms] |
| --- | --- | --- | --- | --- |
|  | First section PA | Second section PB | Third section PC |  |
| 55 or more, less than 60 | 40 | 30 | 3 | 7.3 |
| 60 or more, less than 65 | 26 | 20 | 5 | 7.6 |
| 65 or more, less than 70 | 10 | 10 | 10 | 9.0 |
| 70 or more, less than 75 | 5 | 10 | 15 | 10.6 |
| 75 or more, less than 80 | 5 | 10 | 20 | 11.0 |
| 80 or more, less than 85 | 6 | 10 | 30 | 11.5 |
| 85 or more, less than 90 | 7 | 15 | 35 | 11.3 |
| 90 or more, less than 95 | 8 | 15 | 30 | 10.9 |
| 95 or more, less than 100 | 10 | 15 | 25 | 10.3 |
| 100 or more, less than 130 | 15 | 15 | 15 | 9.0 |

In Table 2, the second voltage Vla2 is 90 V and the third voltage Vla3 is 75 V. In Table 2, the number of the unit periods U included in the second section PB also changes according to the change in the lamp voltage Vla. In Table 2, in a range in which the lamp voltage Vla is 55 V or more and less than 65 V, the number of the unit periods U decreases in the order of the first section PA, the second section PB, and the third section PC. In a range in which the lamp voltage Vla is 70 V or more and less than 100 V, the number of unit periods U increases in the order of the first section PA, the second section PB, and the third section PC. In a range in which the lamp voltage Vla is 65 V or more and less than 70 V and a range in which the lamp voltage Vla is 100 V or more and less than 130 V, the number of the unit periods U is the same in the sections.

In Table 2, average length of the first direct current periods DC1 is also shown. The average length of the first direct current periods DC1 is a value obtained by dividing a sum of the lengths td1 of the first direct current periods DC1 in the sections including the first section PA, the second section PB, and the third section PC by a total number of the unit periods U included in the sections including the first section PA, the second section PB, and the third section PC.

In Table 2, in a range in which the lamp voltage Vla is less than 85 V, the average length of the first direct current periods DC1 increases stepwise according to the increase in the lamp voltage Vla. In a range in which the lamp voltage Vla is 85 V or more, the average length of the first direct current periods DC1 decreases stepwise according to the increase in the lamp voltage Vla. In this way, by changing the numbers of the unit periods U included in the sections as shown in Table 2, it is possible to change the heat load applied to the first electrode 92 in the same manner as when the length td of the first direct current period DC1 is changed as shown in Table 1.

The control section 40 may increase, according to the increase in the lamp voltage Vla, the frequency f of the alternating current supplied to the discharge lamp 90 in the alternating current period AC. With this configuration, when the discharge lamp 90 is deteriorated, it is possible to further stabilize the electric discharge position (the arc position). It is possible to suppress the protrusion 552p from being flattened. Consequently, it is easy to grow the protrusion 552p to be long. It is possible to further suppress the deterioration of the discharge lamp 90. An example of changes in the frequency f in the alternating current period AC is shown in Table 3.

TABLE 3

| Lamp voltage Vla [V] | Frequency f of the alternating current period AC [Hz] | | |
|---|---|---|---|
| | First alternating current period AC1 | Second alternating current period AC2 | Third alternating current period AC3 |
| 55 or more, less than 80 | 135 | 280 | 165 |
| 80 or more, less than 95 | 220 | 340 | 280 |
| 95 or more, less than 130 | 340 | 420 | 520 |

In the example shown in Table 3, in a range in which the lamp voltage Vla is 55 V or more and less than 80 and a range in which the lamp voltage Vla is 80 V or more and less than 95 V, the frequency f increases in the order of the first alternating current period AC1, the third alternating current period AC3, and the second alternating current period AC2. On the other hand, in a range in which the lamp voltage Vla is 95 V or more and less than 130 V, the frequency f increases in the order of the first alternating current period AC1, the second alternating current period AC2, and the third alternating current period AC3. That is, in the example shown in Table 3, when the lamp voltage Vla increases, the frequency f of the third alternating current period AC3 is larger than the frequency f of the second alternating current period AC2. Consequently, a way of the change in the frequency f in the alternating current period AC changes according to the change in the lamp voltage Vla. It is possible to further increase the stimulus due to the heat load applied to the first electrode 92.

The control section 40 may set the frequency f of the alternating current supplied to the discharge lamp 90 in the alternating current period AC lower as the length td of the direct current period DC is larger. With this configuration, it is possible to set the frequency f in the alternating current period AC lower in a section in which the heat load applied to the first electrode 92 is larger. Consequently, in the third section PC, it is possible to increase a heat load applied to the first electrode 92 in the alternating current period AC in addition to the direct current period DC. Therefore, in the third section PC, it is possible to further improve the melting amount of the protrusion 552p. In the first section PA, since the frequency f in the alternating current period AC increases, it is possible to further facilitate the formation of the protrusion 552p. As explained above, with this configuration, it is possible to more effectively perform the melting and the formation of the protrusion 552p. It is possible to grow the protrusion 552p to be thicker. Consequently, it is possible to stably maintain the shape of the protrusion 552p. As a result, it is possible to further improve the life of the discharge lamp 90. An example of the frequencies f in the sections is shown in Table 4.

TABLE 4

| | Frequency f of the alternating current period AC [Hz] | | |
|---|---|---|---|
| | First alternating current period AC1 | Second alternating current period AC2 | Third alternating current period AC3 |
| First section PA | 220 | 420 | 280 |
| Second section PB | 165 | 340 | 220 |
| Third section PC | 135 | 280 | 165 |

Second Embodiment

In a second embodiment, a first section (a section) PD, a second section (a section) PE, and a third section (a section) PF shown in FIG. 7 are provided instead of the first section PA, the second section PB, and the third section PC in the first embodiment. The first section PD is configured by a continuous plurality of first unit periods (unit periods) U1. The configuration of the first unit period U1 is the same as the configuration of the unit period U in the first embodiment. The configuration of the first section PD is the same as the configuration of the first section PA in the first embodiment.

Figure 10:
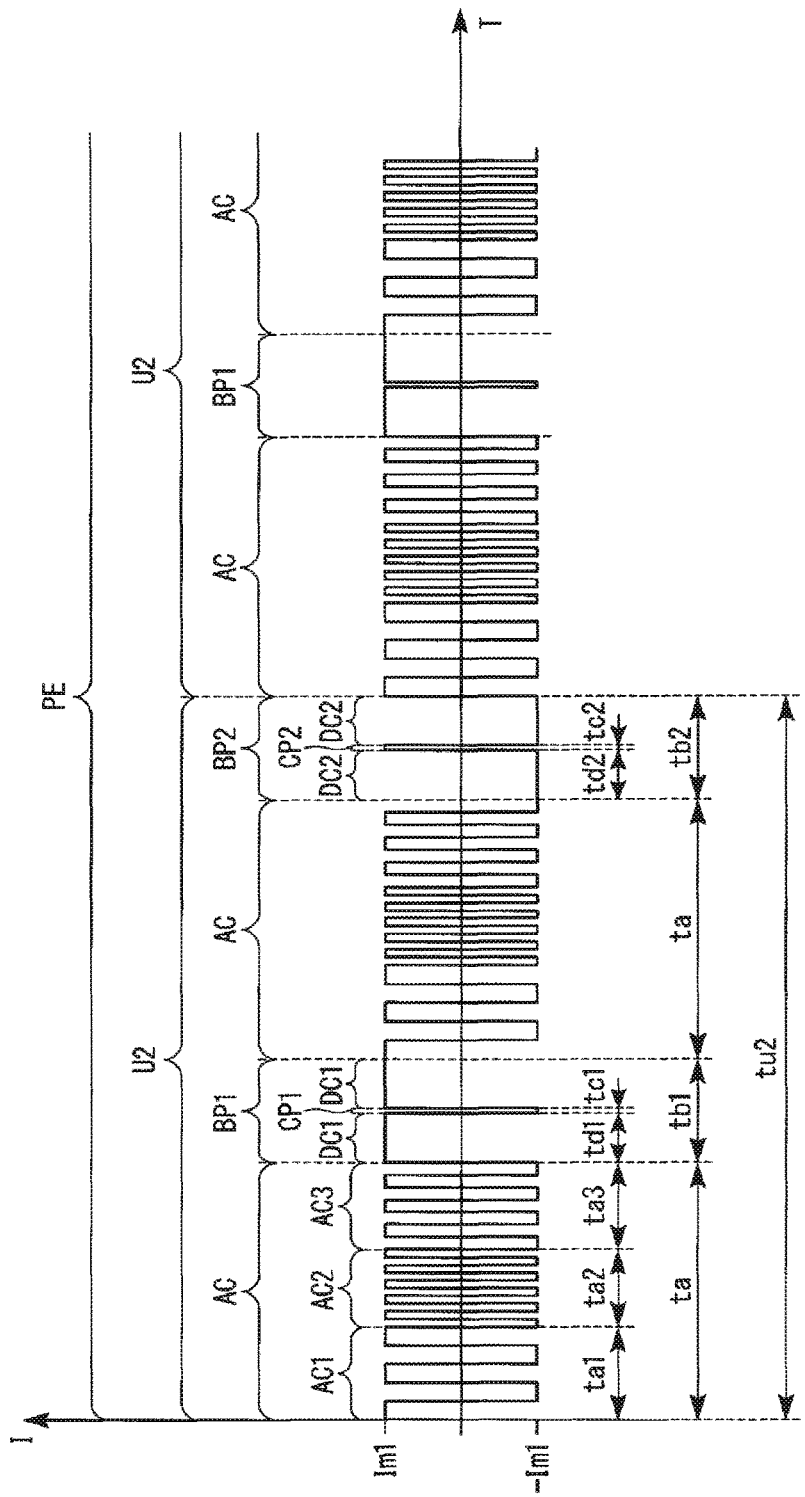
FIG. 10 is a diagram showing an example of a driving current in a second embodiment.

FIG. 10 is a diagram showing the second section PE. In FIG. 10, the vertical axis indicates the driving current I and the horizontal axis indicates the time T. As shown in FIG. 10, the second section PE is configured by a continuous plurality of second unit periods (unit periods) U2. The second unit period U2 includes the alternating current period AC, a first biased period BP1, and a second biased period BP2. In an example shown in FIG. 10, the second unit period U2 is configured by providing the alternating current period AC, the first biased period BP1, the alternating current period AC, and the second biased period BP2 in this order.

The first biased period BP1 includes a plurality of first direct current periods DC1 and a first opposite polarity period CP1. In the example shown in FIG. 10, two first direct current periods DC1 are provided for each of the first biased periods BP1.

The first opposite polarity period CP1 is a period provided between the first direct current periods DC1. A direct current having the second polarity is supplied to the discharge lamp 90 in the period. That is, in the first opposite polarity period CP1, a direct current having a polarity opposite to the polarity of the direct current supplied to the discharge lamp 90 in the first direct current period DC1 is supplied to the discharge lamp 90. Length tc1 of the first opposite polarity period CP1 is smaller than the length td1 of the first direct current period DC1 and smaller than 0.5 ms. In the example shown in FIG. 10, one first opposite polarity period CP1 is provided for each first biased period BP1.

The second biased period BP2 includes a plurality of second direct current periods DC2 and a second opposite polarity period CP2. In the example shown in FIG. 10, two second direct current periods DC2 are provided for each of the second biased periods BP2. In this embodiment, the configuration of the second biased period BP2 is the same as the configuration of the first biased period BP1 except that a polarity is inverted.

The second opposite polarity period CP2 is a period provided between the second direct current periods DC2. A direct current having the first polarity is supplied to the discharge lamp 90 in the period. That is, in the second opposite polarity period CP2, a direct current having a polarity opposite to the polarity of the direct current supplied to the discharge lamp 90 in the second direct current period DC2 is supplied to the discharge lamp 90. Length tc2 of the second opposite polarity period CP2 is smaller than the length td2 of the second direct current period DC2 and smaller than 0.5 ms. In the example shown in FIG. 10, one second opposite polarity period CP2 is provided for each of the second biased periods BP2.

Figure 11:
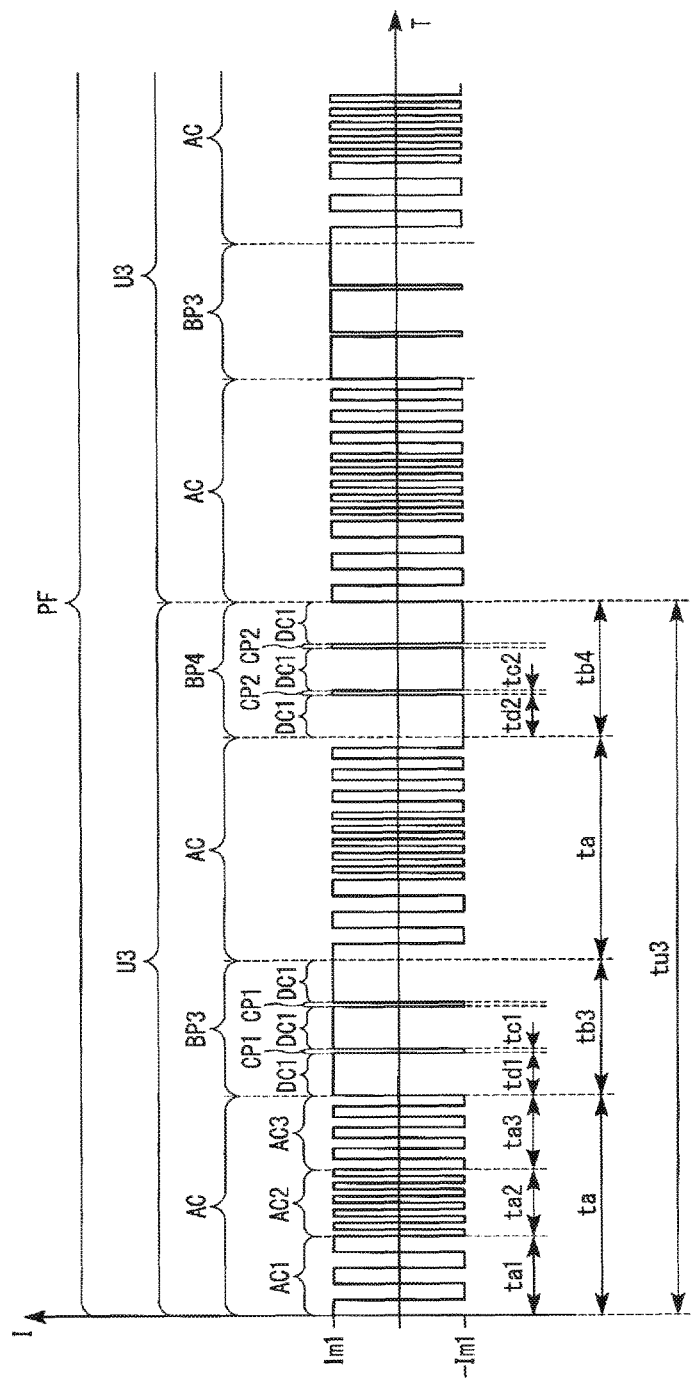
FIG. 11 is a diagram showing an example of the driving current in the second embodiment.

FIG. 11 is a diagram showing the third section PF. In FIG. 11, the vertical axis indicates the driving current I and the horizontal axis indicates the time T. As shown in FIG. 11, the third section PF is configured by a continuous plurality of third unit periods (unit periods) U3. The third unit period U3 includes the alternating current period AC, a first biased period BP3, and a second biased period BP4. In the example shown in FIG. 11, the third unit period U3 is configured by providing the alternating current period AC, the first biased period BP3, the alternating current period AC, and the second biased period BP4 in this order.

The first biased period BP3 is configured by three first direct current periods DC1 and two first opposite polarity periods CP1. The second biased period BP4 is configured by three second direct current periods DC2 and two second opposite polarity periods CP2. Length tb3 of the first biased period BP3 in the third section PF is larger than length tb1 of the first biased period BP1 in the second section PE. Length tb4 of the second biased period BP4 in the third section PF is larger than length tb2 of the second biased period BP2 in the second section PE. Consequently, length tu3 of the third unit period U3 is larger than length tu2 of the second unit period U2.

In this embodiment, as in the first embodiment, the first section PD, the second section PE, and the third section PF are provided such that the length td of the direct current period DC, that is, length obtained by adding up the lengths td1 of the first direct current periods DC1 and the lengths td2 of the second direct current periods DC2 in the unit periods U temporally increases and decreases. As shown in FIG. 7, a pattern is cyclically repeated in which the sections are provided such that the length td of the direct current period DC increases in the order of the first section PD the second section PE, and the third section PF and, thereafter, the sections are provided such that the length td of the direct current period DC decreases in the order of the third section PF, the second section PE, and the first section PD. That is, the control section 40 changes the length td of the direct current period DC to temporally repeat an increase and a decrease. Therefore, it is possible to alternately perform the melting and the formation of the protrusion 552p. It is possible to grow the protrusion 552p to be thicker. It is easy to stably maintain the shape of the protrusion 552p. Consequently, it is possible to further improve the life of the discharge lamp 90.

For example, when the length td1 of the first direct current period DC1 in the section is set to be equal to or larger than a predetermined value, the temperature of the second electrode 93 functioning as the cathode sometimes excessively drops in the first direct current period DC1. In this case, when the second electrode 93, the temperature of which drops, is heated and melted, in some case, it is hard to raise the temperature of the second electrode 93 and it is hard to melt the protrusion 562p of the second electrode 93. Consequently, the second electrode 93 is deformed and a flicker and blackening easily occur. The illuminance of the projector 500 sometimes drops. Consequently, the life of the discharge lamp 90 sometimes cannot be suitably improved.

On the other hand, according to this embodiment, the first opposite polarity period CP1 is provided between the plurality of first direct current periods DC1. In the first opposite polarity period CP1, since the second polarity 93 functions as the anode, the second electrode 93 is heated. Consequently, it is possible to suppress the temperature of the second electrode 93 from excessively dropping while increasing the length td of the direct current period DC with the plurality of first direct current periods DC1 and improving the melting amount of the protrusion 552p. Therefore, it is possible to suppress the deformation of the second electrode 93 and suppress the occurrence of the flicker and the blackening and the illuminance decrease of the projector 500. As a result, according to this embodiment, it is possible to further improve the life of the discharge lamp 90. The same applies to the second biased period BP2.

Note that, in the above explanation, the number of the first direct current periods DC1 included in the first unit period U1 is set to one, the number of the first direct current periods DC1 included in the second unit period U2 is set to two, and the number of the first direct current periods DC1 included in the third unit period U3 is set to three. However, not only this, but, in the first unit period U1 to the third unit period U3, the number of the included direct current periods DC1 is not particularly limited and may be four or more. For example, in the first unit period U1, the biased period may be provided by providing two or more first direct current periods DC1.

The control section 40 may change, on the basis of the lamp voltage Vla, the numbers of the first direct current periods DC1 respectively included in the first unit period U1 to the third unit period U3. Specifically, for example, when the lamp voltage Vla is smaller than a fourth voltage Vla4, the control section 40 increases, according to the increase in the lamp voltage Vla, the number of the first direct current periods DC1 included in the second unit period U2. When the lamp voltage Vla is equal to or larger than the fourth voltage Vla4, the control section 40 reduces, according to the increase in the lamp voltage Vla, the number of the first direct current periods DC1 included in the second unit period U2. The control section 40 controls the number of the second direct current periods DC2 in the same manner as the first direct current period DC1. The control section 40 controls the third unit period U3 in the same manner.

With this configuration, the length td of the direct current period DC can be set larger as the number of the first direct current periods DC1 is larger. Therefore, when the discharge lamp 90 is deteriorated, it is possible to improve the melting amount of the protrusion 552p. With this configuration, when the deterioration of the discharge lamp 90 relatively greatly progresses, it is possible to suitably reduce the heat load applied to the first electrode 92. It is possible to suppress the disappearance of the protrusion 552p. Even when the number of the first direct current periods DC1 increases, since the first opposite polarity period CP1 is provided between the first direct current periods DC1, it is possible to suitably suppress the temperature of the second electrode 93 from excessively dropping.

An example of the numbers of the first direct current periods DC1 includes in the unit periods of the sections is shown in Tale 5.

TABLE 5

| Lamp voltage Vla [V] | Number of the first direct current periods DC1 included in the unit period U | | |
|---|---|---|---|
| | First section PD | Second section PE | Third section PF |
| 55 or more, less than 60 | 1 | 2 | 3 |
| 60 or more, less than 65 | 1 | 2 | 3 |
| 65 or more, less than 70 | 1 | 2 | 4 |
| 70 or more, less than 75 | 1 | 3 | 4 |
| 75 or more, less than 80 | 1 | 3 | 5 |
| 80 or more, less than 85 | 1 | 4 | 6 |
| 85 or more, less than 90 | 1 | 4 | 6 |
| 90 or more, less than 95 | 1 | 3 | 5 |
| 95 or more, less than 100 | 1 | 3 | 4 |
| 100 or more, less than 130 | 1 | 2 | 4 |

In the example shown in Table 5, in the first unit period U1 in the first section PD, the biased period is not provided and one first direct current period DC1 is provided as in the first embodiment. Note that, for example, as a configuration in which the biased period is not provided in the first section PD and the second section PE, the biased period may be provided only in the third section PF.

The lengths td1 of the first direct current periods DC1 provided in the first unit period U1, the second unit period U2, and the third unit period U3 may be different in each of the unit periods.

In the embodiments explained above, the number of sections is set to three. However, not only this, but the number of sections may be two or may be four or more. The number of periods in which the frequencies f included in the alternating current periods AC are different may be two or may be four or more. The frequency f does not have to change in the alternating current period AC. The first voltage Vla1, the second voltage Vla2, the third voltage Vla3, and the fourth voltage Vla4 may be the same or may be different.

The configurations explained above can be combined as appropriate as long as the configurations are not contradictory to one another.

In the embodiments, the example is explained in which the invention is applied to the transmission type projector. However, the invention can be applied to a reflection type projector as well. The "transmission type" means that a liquid crystal light valve including a liquid crystal panel is a type for transmitting light. The "reflection type" means that the liquid crystal light valve is a type for reflecting light. Note that the light modulating device is not limited to the liquid crystal panel or the like and may be a light modulating device including, for example, a micromirror.

In the embodiments, the example of the projector 500 including the three liquid crystal panels 560R, 560G, and 560B (the liquid crystal light valves 330R, 330G, and 330B) is explained. However, the invention can also be applied to a projector including only one liquid crystal panel and a projector including four or more liquid crystal panels.

The entire disclosure of Japanese Patent Application No. 2016-020192, filed Feb. 4, 2016 is expressly incorporated by reference herein.

What is claimed is:

1. A discharge lamp driving device comprising:
a discharge lamp driving section configured to supply a driving current to a discharge lamp including a first electrode and a second electrode; and
a control section configured to control the discharge lamp driving section, wherein
the control section is configured to repeat a unit period, the unit period includes:
a direct current period including a first direct current period in which a direct current having a first polarity, in which the first electrode functions as an anode, is supplied to the discharge lamp and a second direct current period in which a direct current having a second polarity, in which the second electrode functions as the anode, is supplied to the discharge lamp; and
an alternating current period provided between the first direct current period and the second direct current period, an alternating current being supplied to the discharge lamp in the alternating current period, and
the control section is configured to temporally change length of the direct current period.

2. The discharge lamp driving device according to claim 1, wherein the control section is configured to change the length of the direct current period to temporally repeat an increase and a decrease in the length of the direct current period.

3. The discharge lamp driving device according to claim 1, wherein the alternating current period includes a plurality of periods in which each frequency of an alternating current supplied to the discharge lamp is different from one another.

4. The discharge lamp driving device according to claim 1, further comprising a voltage detecting section configured to detect an inter-electrode voltage of the discharge lamp, wherein
the control section is configured to change the length of the direct current period on the basis of the inter-electrode voltage.

5. The discharge lamp driving device according to claim 4, wherein
when the inter-electrode voltage is smaller than a first voltage, the control section is configured to increase the length of the direct current period according to an increase of the inter-electrode voltage, and
when the inter-electrode voltage is equal to or larger than the first voltage, the control section is configured to reduce the length of the direct current period according to the increase of the inter-electrode voltage.

6. The discharge lamp driving device according to claim 1, further comprising a voltage detecting section configured to detect an inter-electrode voltage of the discharge lamp, wherein
the control section is configured to provide a section in which the unit period is repeated,
the section includes a section in which the direct current period in the unit period has first length and a section in which the direct current period in the unit period has second length larger than the first length,
when the inter-electrode voltage is smaller than a second voltage, the control section is configured to increase a number of the unit periods included in the section in which the direct current period has the second length, according to an increase of the inter-electrode voltage, and
when the inter-electrode voltage is equal to or larger than the second voltage, the control section is configured to reduce the number of the unit periods included in the section in which the direct current period has the second length, according to the increase of the inter-electrode voltage.

7. The discharge lamp driving device according to claim 6, wherein when the inter-electrode voltage is smaller than a third voltage, the control section is configured to reduce a number of the unit periods included in the section in which the direct current period has the first length, according to an increase of the inter-electrode voltage, and when the inter-electrode voltage is equal to or larger than the third voltage, the control section is configured to increase the number of the unit periods included in the section in which the direct current period has the first length, according to the increase of the inter-electrode voltage.

8. The discharge lamp driving device according to claim 1, further comprising a voltage detecting section configured to detect an inter-electrode voltage of the discharge lamp, wherein the control section is configured to increase a frequency of an alternating current supplied to the discharge lamp in the alternating current period, according to an increase of the inter-electrode voltage.

9. The discharge lamp driving device according to claim 1, wherein the control section is configured to reduce a frequency of an alternating current supplied to the discharge lamp in the alternating current period, as length of the direct current period is larger.

10. The discharge lamp driving device according to claim 1, wherein the unit period include:
a first biased period including a plurality of the first direct current periods and a first opposite polarity period provided between the first direct current periods, the direct current having the second polarity being supplied to the discharge lamp in the first opposite polarity period; and a second biased period including a plurality of the second direct current periods and a second opposite polarity period provided between the second direct current periods, the direct current having the first polarity being supplied to the discharge lamp in the second opposite polarity period, length of the first opposite polarity period is smaller than length of the first direct current period and smaller than 0.5 ms, and length of the second opposite polarity period is smaller than length of the second direct current period and smaller than 0.5 ms.

11. The discharge lamp driving device according to claim 10, further comprising a voltage detecting section configured to detect an inter-electrode voltage of the discharge lamp, wherein when the inter-electrode voltage is smaller than a fourth voltage, the control section is configured to increase a number of the first direct current periods included in the unit period, according to an increase of the inter-electrode voltage, and when the inter-electrode voltage is equal to or larger than the fourth voltage, the control section is configured to reduce the number of the first direct current periods included in the unit period, according to the increase of the inter-electrode voltage.

12. A projector comprising:
a discharge lamp configured to emit light;
the discharge lamp driving device according to claim 1;
a light modulating device configured to modulate light emitted from the discharge lamp according to an image signal; and
a projection optical system configured to project the light modulated by the light modulating device.

13. A projector comprising:
a discharge lamp configured to emit light;
the discharge lamp driving device according to claim 2;
a light modulating device configured to modulate light emitted from the discharge lamp according to an image signal; and
a projection optical system configured to project the light modulated by the light modulating device.

14. A projector comprising:
a discharge lamp configured to emit light;
the discharge lamp driving device according to claim 3;
a light modulating device configured to modulate light emitted from the discharge lamp according to an image signal; and
a projection optical system configured to project the light modulated by the light modulating device.

15. A projector comprising:
a discharge lamp configured to emit light;
the discharge lamp driving device according to claim 4;
a light modulating device configured to modulate light emitted from the discharge lamp according to an image signal; and
a projection optical system configured to project the light modulated by the light modulating device.

16. A projector comprising:
a discharge lamp configured to emit light;
the discharge lamp driving device according to claim 5;
a light modulating device configured to modulate light emitted from the discharge lamp according to an image signal; and
a projection optical system configured to project the light modulated by the light modulating device.

17. A projector comprising:
a discharge lamp configured to emit light;
the discharge lamp driving device according to claim 6;
a light modulating device configured to modulate light emitted from the discharge lamp according to an image signal; and
a projection optical system configured to project the light modulated by the light modulating device.

18. A projector comprising:
a discharge lamp configured to emit light;
the discharge lamp driving device according to claim 7;
a light modulating device configured to modulate light emitted from the discharge lamp according to an image signal; and
a projection optical system configured to project the light modulated by the light modulating device.

19. A projector comprising:
a discharge lamp configured to emit light;
the discharge lamp driving device according to claim 8;
a light modulating device configured to modulate light emitted from the discharge lamp according to an image signal; and
a projection optical system configured to project the light modulated by the light modulating device.

20. A discharge lamp driving method for supplying a driving current to a discharge lamp including a first electrode and a second electrode and driving the discharge lamp, the discharge lamp driving method comprising:
supplying the driving current to the discharge lamp to repeat a unit period including
a direct current period including a first direct current period in which a direct current having a first polarity, in which the first electrode functions as an anode, is supplied to the discharge lamp and a second direct current period in which a direct current having a second polarity, in which the second electrode functions as the anode, is supplied to the discharge lamp and an alternating current period provided between the first direct current period and the second direct current period, an alternating current being supplied to the discharge lamp in the alternating current period; and temporally changing length of the direct current period.

* * * * *